(12) United States Patent
Kinno et al.

(10) Patent No.: US 6,185,274 B1
(45) Date of Patent: Feb. 6, 2001

(54) IMAGE DETECTING DEVICE AND AN X-RAY IMAGING SYSTEM

(75) Inventors: Akira Kinno, Yokohama; Masaki Atsuta, Yokosuka; Takuya Sakaguchi; Manabu Tanaka, both of Otawara; Mitsushi Ikeda; Kouhei Suzuki, both of Yokohama, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/265,693

(22) Filed: Mar. 10, 1999

(30) Foreign Application Priority Data

Mar. 20, 1998 (JP) .................................................. 10-071672
Dec. 3, 1998 (JP) .................................................. 10-344424

(51) Int. Cl.[7] ...................................................... H05G 1/64
(52) U.S. Cl. ........................ 378/98.8; 378/57; 250/370.07
(58) Field of Search ............... 378/57, 98.8; 250/370.07, 250/370.09

(56) References Cited

U.S. PATENT DOCUMENTS

| 4,689,487 | | 8/1987 | Nishiki et al. . | |
|---|---|---|---|---|
| 5,194,736 | * | 3/1993 | Meulenbrugge et al. | 250/370.07 |
| 5,260,560 | * | 11/1993 | Yamanobe | 250/211 |
| 5,319,206 | | 6/1994 | Lee et al. . | |
| 5,530,238 | * | 6/1996 | Meulenbrugge et al. | 250/208.1 |
| 5,668,375 | * | 9/1997 | Petrick et al. | 250/370.09 |
| 5,981,931 | * | 11/1999 | Kinno et al. | 250/208.1 |
| 6,034,725 | * | 3/2000 | Franklin et al. | 348/310 |
| 6,075,256 | * | 6/2000 | Kaifu et al. | 257/53 |

FOREIGN PATENT DOCUMENTS

| 10-10237 | 1/1998 | (JP) . |
|---|---|---|
| 10-170658 | 6/1998 | (JP) . |

* cited by examiner

*Primary Examiner*—David V. Bruce
*Assistant Examiner*—Pamela R. Hobden
(74) *Attorney, Agent, or Firm*—Oblon, Spivak, McClelland, Maier & Neustadt, P.C.

(57) ABSTRACT

An image detecting device has a large dynamic range that deals with a plurality of image detecting modes. The image detecting device is composed of pixels e (i, j) arranged in a matrix array. Each pixel has a photoelectric element. In each pixel, a capacitor 102 and a protecting diode 103 are disposed. The capacitor 102 stores electric charge corresponding to the intensity of penetrated light to the relevant pixel. The protecting diode limits the capacitance. A bias voltage is supplied to the protecting diode 103 through a bias line Bias. The bias voltage is adjusted by a bias voltage controlling system 133 corresponding to the frame rate. Thus, the influence of a leak current in the off-state of the protecting diode 103 can be alleviated against electric charge stored in the capacitor 102. Consequently, an image with a high S/N ratio can be obtained regardless of the frame rate.

19 Claims, 21 Drawing Sheets

IMAGE DETECTING DEVICE AND AN X-RAY IMAGING SYSTEM

BACKGROUND OF THE INVENTION

1. Field of the Invention

The present invention relates to an image detecting device for converting light into an electric signal and obtaining an image, in particular, to an image detecting device for directly converting light into electric charge and obtaining an image. In addition, the present invention relates to an image detecting device for use with a medical X-ray diagnosing system. Moreover, the present invention relates to a bi-plane type image detecting device having a plurality of image detecting planes.

2. Description of the Related Art

Image detecting devices with photoelectric elements as image detecting elements have been widely used for video cameras, digital still cameras, and so forth. In addition, such image detecting devices instead of conventional silver-halide films have been used for medical X-ray diagnosing system.

In recent years, databases for medical data of patients have been created so as to promptly and accurately treat the patients. There are also needs of databases for X-ray image data. Thus, it is desired to digitize detected X-ray images.

In medical X-ray diagnosing systems, diagnosis images have been photographed with silver-halide films. To digitize such images, after a photographed film is developed, the developed image should be scanned with a scanner. However, digitized images cannot be quickly and easily obtained. In addition, when the developed images are scanned, the image quality deteriorates.

Recently, a system that directly detects digital images with a CCD camera whose diameter is as small as for example one inch has been accomplished.

However, when the lungs of a patient are detected, it is necessary to detect an area of around 30 cm×30 cm. Thus, since an optical device that collects light is required, the size of the image detecting device becomes large.

As a system for solving such a problem, an image detecting device using thin film transistors (TFTs) composed of a-Si (amorphous silicon) as a semiconductor film has been proposed (for example U.S. Pat. No. 4,689,487).

FIG. 15 is a block diagram showing an example of the structure of such an image detecting device. FIG. 16 is a schematic diagram showing an example of the structure of an image detecting device using a-Si TFTs.

An X-ray radiated from an X-ray source 51 penetrates an object 52 (a human body) and enters photoelectric elements of the a-Si TFT image detecting device 53. The a-Si TFT image detecting device 53 converts the X-ray that has penetrated the object 52 into an analog signal corresponding to the dose of the X-ray. An A/D converting portion 57 converts the analog signal into a digital signal in time series. The digital signal is stored in an image memory 58.

The image memory 58 can store image data for one to several pictures. The image data is successively stored to predetermined addresses corresponding to a control signal received from a controlling portion 63. An arithmetic processing portion 59 extracts image data from the image memory 58, calculates the extracted image data, and stores the calculated result to the image memory 58. The calculated image data is supplied from the image memory 58 to a D/A converting portion 60. The D/A converting portion 60 converts the digital signal into an analog signal. The analog signal is output to an external processing circuit such as an image monitor 61 through an interface. Then the X-ray transmitted images of the object 52 are displayed on the image monitor 61.

In FIG. 16, a pixel e1,1 that is an element of an image detecting area is composed of an a-Si thin film transistor 144, a photoelectric film 140, and a pixel capacitor 142. The thin film transistor 144 is composed of a-Si as a semiconductor film. Pixels are arranged in a matrix array of 2000 (W) pixels×2000 (L) pixels (hereinafter referred to as thin film transistor array).

A bias voltage of a power supply 148 is applied to the photoelectric film 140. The a-Si TFT 144 is connected to a signal line S1 and a scan line G1. The a-Si TFT 144 is turned on/off corresponding to the voltage of the scanning signal applied from a scan line driving circuit 152 to the gate electrode through the scan line. A first end of the signal line S1 is connected to an amplifier 145 such as a sense amplifier that detects a signal.

When light (for example, an X-ray or a soft X-ray) enters the photoelectric film, a current flows in the photoelectric film 140. Thus, electric charge is stored in the pixel capacitor 142. When the scan line driving circuit 152 drives the scan line and thereby all TFTs connected thereto are turned on, the stored electric charge flows to the amplifier 154 through the signal line S1. Due to the difference of the amount of electric charge corresponding to the dose of light entered into each pixel, the amplitude of an output signal of the amplifier 154 varies corresponding to the difference. In the device shown in FIG. 16, when an analog signal that is output form the amplifier 154 is converted into a digital signal, a digital image can be directly obtained.

The structure of the pixel area shown in FIG. 16 is the same as the structure of a TFT-LCD that is used for a note type personal computer. The TFT-LCD is an active matrix type liquid crystal display of which thin film transistors are used as switching elements. Thus, an image detecting device that is thin and that has a large screen can be easily fabricated.

There are two types of image detecting devices that convert light such as an X-ray into electric charge.

The first type is referred to as indirect converting type. In the indirect converting type, an X-ray is converted into visible light by phosphor, scintillator or the like. The visible light is converted into electric charge by a photoelectric film. The second type is referred to as direct converting type. In the direct converting type, an X-ray is directly converted into electric charge by a photoelectric film.

In the indirect converting type, although an X-ray is converted into visible light by scintillator, since the light scatters in the scintillator, a sufficient resolution cannot be obtained. On the other hand, in the direct converting type, since an X-ray does not penetrate, an image with a high resolution can be obtained. An image with a high resolution is an essential condition for a medical image. Thus, a direct converting type image detecting device is becoming attractive.

However, in the direct converting type image detecting device, the photoelectric film should be thickened (for example, in the range from several 100 $\mu$m to several mm) so as to improve the efficiency for converting an X-ray into electric charge. Thus, to apply a proper electric field to the photoelectric film, a high voltage of several kilovolts should be applied to the photoelectric film. Thus, in the direct converting type image detecting device, it is necessary to take countermeasures against dielectric breakdown of the TFT array.

As one of the countermeasures against dielectric breakdown, a method for forming a dielectric layer on a photoelectric film has been proposed (as U.S. Pat. No. 5,319,206). However, in this method, electric charge stored in the dielectric layer cannot be quickly discharged. Thus, images cannot be successively detected.

To prevent dielectric breakdown from taking place in a TFT array, a method for disposing a protecting circuit in a pixel e (i, j) has been disclosed (for example, Japanese Patent Laid-Open Application Nos. 10-10237 and 10-170658).

FIG. 24 shows an example of an a-Si TFT image detecting device of which each pixel has a high voltage protecting diode.

In FIG. 24, each of pixels e (i, j) is composed of an electric charge reading a-Si TFT 201, an electric charge capacitor 202, a protecting diode 214, and a photoelectric film 203. The pixels e (i, j) are arranged in a matrix array of 2000 (W) pixels×2000 (L) pixels (hereinafter referred to as thin film transistor array). A several kV high voltage of a power supply 205 is applied to a photoelectric film 203. The source electrode of the a-Si TFT 201 is connected to a signal line S1. The gate electrode is connected to a scan line G1. The protecting diode 214 and the electric charge capacitor 202 are connected in parallel. The first end of the protecting diode 214 is connected to a bias line Bias. Normally, a voltage is applied to the bias line Bias so that the protecting diode 214 is turned off. When an X-ray enters the a-Si TFT image detecting device, a current flows in the photoelectric film 203. Thus, the voltage of a pixel electrode (a connected portion (P) of an electric charge reading a-Si TFT 201 and an electric charge capacitor 202) rises. When an X-ray excessively enters the image detecting device as if an X-ray directly enters the image detecting device not through the object), in the worst case, the voltage of the pixel electrode rises to the power supply voltage (several kV) supplied to the photoelectric film 203. thus, when the voltage of the pixel electrode exceeds a predetermined voltage, the protecting diode 214 operates so that excessive electric charge flows to the bias line Bias. Since the voltage of the pixel electrode is limited to a predetermined voltage, dielectric breakdown can be prevented from taking in the insulating film.

In an image detecting device such as an X-ray image detecting device, image detecting modes such as penetration, DA (Digital-Angiography), and DSA (Digital-Subtraction-Angiography) are used. The penetration mode is a moving picture mode. The DA and DSA modes are still picture modes. The dose of an X-ray and a frame rate of a detected image vary corresponding to each image detecting mode.

In the moving picture mode, the dose of a radiated X-ray is around several μR/frame and the frame rate of a detected image is in the range from around 30 to 100 fps. On the other hand, in the still picture mode, the dose of a radiated X-ray is around several 100 μR/frame and the frame rate of a detected image is several fps.

In the method of which a protecting circuit is disposed in each pixel, an image can be detected in any image detecting mode of moving picture mode and still picture mode.

However, the amount of electric charge stored in each pixel in the moving picture mode is different from that in the still picture mode by around three digits. Thus, the performance required for the image detecting device depends on the image detecting mode. In other words, in the moving picture mode (with a high frame rate), low nose is the most important factor. On the other hand, in the still picture mode, a large signal is the most important factor.

The protecting diode 214 is normally turned off. Even in the off state, a very weak leak current (around $10^{-10}$ to $10^{-14}$ [A]) always flows. This current is stored in the pixel. Thus, image quality deteriorates such as low dynamic range and large noise.

In the penetration mode, since the signal level of the current stored in the pixel is low, the influence of the leak current is relatively large.

In addition, as described above, the amount of electric charge stored in the pixel in the penetration mode is different from that in the DSA mode by around three digits. Thus, the dynamic range of the A/D converter does not sufficiently correspond to the dynamic range of stored electric charge.

The conventional X-ray image detecting devices have been for a chest diagnosing system, a bust diagnosing system, and a circulatory organ diagnosing system. In these systems, X-ray image detecting devices with a large screen, a high accuracy, and a high frame rate are required.

For example, in the chest diagnosing system, an image detecting area of around 300×300 mm is required. In the bust diagnosing system, a pixel size of 50 μm square is required. In the circulatory organ diagnosing system, a frame rate in the range from around 50 to 100 frames/second is required.

However, as shown in FIG. 17, each scan line has a line resistance. In addition, line capacitors are formed at the intersection of each scan line and each signal line and between the gate electrode and the source electrode of each TFT. Thus, signal delays and waveform distortion take place in a scan line driving signal. Due to the signal delays and waveform distortion, a selection period and a gate voltage necessary for turning on each TFT cannot be obtained. Thus, since electric charge stored in each pixel cannot be sufficiently read out, an image detecting device with a large screen, a high resolution, and a high frame rate cannot be accomplished.

In particular, when an object is detected in the moving picture mode, an image detecting device with a high resolution and a high frame rate should be accomplished. Thus, the development of an image detecting device with a high resolution and a high frame rate is required.

SUMMARY OF THE INVENTION

The present invention is made from the above-described point of view. In other words, an object of the present invention is to provide an image detecting device that detects an image with low noise and high image quality. Another object of the present invention is to provide an image detecting device that detects an image with low noise and high image quality corresponding to various different image detecting modes.

Another object of the present invention is to provide an image detecting device that optimally adjusts an output signal of a detecting amplifier corresponding to each image detecting mode.

Another object of the present invention is to provide an image detecting device with a large screen, a high resolution, and a high frame rate in particular for a moving picture image detecting mode.

To solve the above-described problems, the image detecting device according to the present invention has the following structures.

A first aspect of the present invention is an image detecting device, comprising photoelectric elements arranged in a matrix array, respective photoelectric elements having a capacitor capable of storing electric charge corresponding to a dose of light when the photoelectric element is irradiated, a means for limiting the electric charge stored in the capacitor having at least one first switching element connected with the capacitor, the first switching element having leak current when the first switching element is off, and a control circuit controlling a level of the leak current of the first switching element.

As the first switching element, a thin film transistor or a diode such as an MIM can be used. In such a switching element, leak current always flows even if the switching element is turned off. Due to the leak current, the S/N ratio of a detected image deteriorates. According to the present invention, since the level of the leak current is actively controlled corresponding to the radiation intensity to the image detecting device, the dose of light entered into each pixel, the frame rate of the detected image, the image detecting mode, and so forth. Thus, the S/N ratio of the detected image can be secured.

The control circuit has an applying circuit applying at least one bias voltage to a bias line connected to the first switching element, the level of the bias voltage being adjusted corresponding to the dose of light of the photoelectric element.

The image detecting device according to the present invention further comprises a scanning circuit applying a scanning signal to at least one scan line, a second switching element intervened between respective photoelectric elements and the signal line, the second switching element being controlled by the scanning signal, the second switching element supplying the stored charge to the signal line when the second switching element is on.

The image detecting device may further comprise a selecting circuit selecting a frequency of the scanning signal, a level of the bias voltage being adjusted corresponding to the frequency of the scanning signal.

In addition, the image detecting device may further comprise a means for outputting a signal from the signal line, the signal corresponding to the electric charge stored in the capacitor, and an amplifying circuit amplifying a level of the output signal corresponding to the frequency of the scanning signal.

The image detecting device according to the present invention may further comprise a means for outputting a signal from the signal line where the electronic charge is supplied from the capacitor via the second switching element, and an amplifying circuit amplifying a level of the output signal capable of amplifying the level of the output signal corresponding to the dose of light of the photoelectric element.

In the image detecting device according to the present invention, the respective photoelectric elements capable of directly converting the dosed light to the electric charge is preferably used. Thus, in comparison with a device using a scintillator, an image with a high resolution can be obtained. Alternatively, the photoelectric elements capable of inducing the charge when irradiated by X-ray.

Such a photoelectric element may have an optical conductor containing at least one material selected from the group consisting of a-Se (amorphous selenium), $PbI_2$, TlBr, and ZnCdTe.

In the image detecting device according to the present invention, a thin film switching transistor or a diode can be preferably used as the first switching element of the limiting means.

A second aspect of the present invention is an X-ray imaging system, comprising at least one means for radiating an X-ray, a radiation control circuit controlling the radiating intensity of the X-ray, at least one photoelectric element having a capacitor capable of storing electronic charge corresponding to the dose of the X-ray when the photoelectric element is irradiated, the photoelectric element being arranged in a matrix array, a means for limiting the electric charge stored in the capacitor having at least one first switching element connected with the capacitor, the switching element having leak current when the first switching element is off, and a level control circuit controlling the level of the leak current of the first switching element.

The level of the leak current may be controlled in the above-described manner.

The level of the leak current may be controlled corresponding to the radiating intensity of the X-ray.

The level control circuit may have a means for applying at least one bias voltage to a bias line connected to the first switching element, the level of the bias voltage being controlled corresponding to the radiating intensity of the X-ray.

The X-ray imaging system according to the present invention may further comprise a scanning circuit applying a scanning signal to at least one scan line, a second switching element intervened between respective photoelectric elements and the signal line, the second switching element being controlled by the scanning signal, the second switching element supplying the stored charge to the signal line when the second switching element is on, a selecting circuit selecting the frequency of the scanning signal, the frequency of the scanning signal being controlled corresponding to the radiating intensity of the X-ray.

The X-ray imaging system according to the present invention may further comprise a scanning circuit applying a scanning signal to at least one scan line, a second switching element intervened between respective photoelectric elements and the signal line, the second switching element being controlled by the scanning signal, the second switching element supplying the stored charge to the signal line when the second switching element is an, a selecting circuit selecting the frequency of the scanning signal, and wherein the radiating intensity of the X-ray is controlled corresponding to the selected frequency of the scanning signal.

The X-ray imaging system according to the present invention may comprise means for outputting a signal from a signal line, a level of the output signal corresponding to the electronic charge supplied to the signal line from the capacitor via the second switching element, and an amplifying circuit amplifying a level of the output signal capable of amplifying the level of the output signal corresponding to the radiating intensity of the X-ray.

The X-ray imaging system according to the present invention may comprise photoelectric elements, arranged in a matrix array, each of the photoelectric elements having a capacitor for storing electric charge corresponding to the amount of radiated light, and a means for adjusting the amount of electric charge stored to the capacitor corresponding to the amount of the radiated light.

In addition, the X-ray imaging system according to the present invention comprises photoelectric elements arranged in a matrix array, each of the photoelectric elements having a capacitor for storing electric charge corresponding to the amount of the radiated light, a means for outputting electric charge corresponding to a frame rate, a means for adjusting the frame rate, diodes for limiting the voltage of one of a pair of electrodes that form the capacitor, and a means for controlling the voltage of one of the pair of electrodes that form the capacitor corresponding to the frame rate.

Each photoelectric element is composed of a photoelectric film and a capacitor. The photoelectric film generates electric charge corresponding to an entered electromagnetic wave. The capacitor stores electric charge generated in the photoelectric film. The electromagnetic wave that enters an image detecting plane is two-dimensionally intensity-modulated corresponding to the structure of the object. Electric charge corresponding to the intensity of penetrated light is stored for each pixel. When electric charge is read from each of pixels or a group of pixels, image data can be obtained.

Electric charge is read by a switching element such as a thin film transistor disposed between a capacitor and a signal line of each pixel. When a scanning signal is supplied to the gate of the thin film transistor, the read timing of electric charge can be controlled for each pixel. The scanning signal is supplied from for example a scan line driving circuit.

When the thin film transistor is in the on state, electric charge is supplied to a detecting amplifier through the thin film transistor and the signal line. Thus, when thin film transistors of a plurality of pixels connected to the signal line are scanned, data signals of the pixels along the signal line can be successively output. Analog data signals along the signal line may be amplified. The analog data signals may be converted into digital data signals by an A/D converter.

The frame rate of a detected image can be controlled corresponding to an input signal of the scan line driving circuit.

In the X-ray imaging system according to the present invention, each pixel has a diode that limits the voltage of one of a pair of electrodes (pixel electrodes) that compose a capacitor that stores electric charge. Such a structure is accomplished with a diode interposed between a pixel electrode and a bias line to which a predetermined voltage is applied. When the voltage of the pixel electrode exceeds a predetermined voltage, if the capacitor and the bias line are connected, the amount of electric charge stored to each pixel is limited. Thus, static breakdown can be prevented.

Moreover, in the X-ray imaging system according to the present invention, the voltage of the pixel electrode is adjusted corresponding to the frame rate. The voltage of the pixel electrode is also adversely affected by the leak current in the off state of the diode.

In particular, when the frame rate is high and the amount of electric charge stored in each pixel is small, the influence of the leak current in the off state of the diode against a data signal cannot be ignored. On the other hand, as in the still picture mode, when a data signal with a low frame rate and a large dynamic range is required, a high bias voltage is required. In the X-ray imaging device according to the present invention, since the bias voltage is adjusted corresponding to the frame rate of the detected image, the influence of the leak current in the off state of the diode against image information (electric charge corresponding to the light intensity radiated to each pixel) can be suppressed. Thus, an image with a low nose, a high quality, and a large dynamic range can be obtained.

The frame rate or the voltage of the bias line may be varied continuously or discontinuously.

For example, in the moving picture mode, considering the frame rate and the amount of electric charge of the input signal, the voltage Vs between the bias line and the pixel electrode should satisfy the relation of 1 V>Vs>0 V so as to obtain an image with a low noise.

The X-ray imaging system according to the present invention may comprise photoelectric elements arranged in a matrix array, a means for supplying a scanning signal to a scan line, switching elements for outputting electric charge of the photoelectric elements to the signal line corresponding to the scanning signal, and a means for selecting the gain of the amplifier corresponding to the level of the signal supplied to the signal line.

The X-ray imaging system may further comprise a means for adjusting a bias voltage corresponding to the amount of the radiated light and applying the adjusted bias voltage to the bias line.

The X-ray imaging system according to the present invention may comprise photoelectric elements arranged in a matrix array, a means for supplying a scanning signal to a scan line, switching elements, connected to the scan line, for outputting electric charge of the photoelectric elements to a signal line corresponding to the scanning signal, a means for selecting the gain of the amplifier corresponding to the level of the signal that is output to the signal line, and a means for adjusting the frequency of the scanning signal corresponding to the selected gain.

Thus, in the X-ray imaging system according to the present invention, the gain can be adequately selected corresponding to the level of the data signal that is output to the signal line. Thus, the output signal of the detecting amplifier is adjusted to an optimum value corresponding to the image detecting mode.

In other words, a signal supplied to a scan line driving circuit is switched corresponding to an image detecting mode. In addition, the gain selection signal is supplied to the gain selecting circuit or the detecting amplifier. Thus, even if an image detecting mode is changed, the level of the input signal to the A/D converter can be maintained in a predetermined range. Consequently, since the dynamic range of the A/D converter can be fully used, the S/N ratio of the detected image can be improved.

The gain may be adjusted continuously or stepwise.

A third aspect of the present invention is an X-ray imaging system, comprising at least one device radiating X-ray, a first image detecting device comprising at least one first photoelectric element having a first capacitor capable of storing electronic charge corresponding to the dose of light when the photoelectric element is irradiated, a second image detecting device comprising at least one second photoelectric element having a second capacitor capable of storing the electronic charge corresponding to the dose of light when the photoelectric element is irradiated, a control circuit controlling a first detecting period for storing the electronic charge to the first capacitor, a second detecting period for storing the electronic charge to the second capacitor, the first detecting period and the second detecting period being exclusively set, a means for supplying a ground potential to the first capacitor during the second detecting period and to the second capacitor during the first detecting.

The first image detecting device may have at least one first bias line connected to the first capacitor, the ground potential being supplied to the first capacitor via the first bias line, wherein the second image detecting device has at least one second bias line connected to the second capacitor, the ground potential being supplied to the second capacitor via the second bias line.

The image detecting device is a so-called bi-plane type image detecting device that detects an image with a plurality of detecting planes. The light radiating source for an X-ray may be a single light source or a plurality of light sources arranged for individual image detecting portions. The structure of the first image detecting portion may be the same as the structure of the second image detecting portion. Alternatively, the structure of the first image detecting portion may be different from the structure of the second image detecting portion.

The first detecting period and the second detecting period are exclusively adjusted. In other words, the first detecting period and the second detecting period should be set so that they do not overlap. Alternatively, the first image detecting device and the second image detecting device may have no electric charge storing period.

According to the present invention, in the image detecting period of the first image detecting portion, the voltage of each pixel electrode of the second image detecting portion is maintained at the ground voltage. Likewise, in the image detecting period of the second image detecting portion, the voltage of each pixel electrode of the first image detecting portion is maintained at the ground voltage. Thus, while an image is being detected by the first image detecting portion, even if radiated light enters the second image detecting portion, electric charge is not stored to each pixel of the second image detecting portion. Consequently, the voltage of each pixel electrode does not vary from the ground voltage. This situation applies to the second image detecting portion. Thus, the deterioration of the image quality due to scattered light can be prevented.

To maintain the voltage of each pixel electrode at the ground voltage in the non-image detecting period, the ground voltage is supplied to the bias line of the image detecting device according to the present invention. The voltage of the bias line of the first image detecting portion is maintained at a predetermined voltage in the image detecting period of the first image detecting portion. The voltage of the bias line of the first image detecting portion is maintained at the ground voltage in the second image detecting period of the second image detecting portion. This situation applies to the second image detecting device.

A fourth aspect of the present invention is an imaging detecting device, comprising first photoelectric elements and second photoelectric elements arranged in a matrix array, at least one first scan line and at least one second scan line arranged alternately, a scanning driver for supplying scanning signals to the first scan line and the second scan line, first switching elements intervened between respective first photoelectric elements and the first scan line, second switching elements intervened between respective second photoelectric elements and the second scan line, and a scanning circuit controlling the scanning driver, the scanning driver supplying a first signal for enabling the first switching elements to be on during a first period, for enabling the second switching elements to be on during a second period, at least one part of the first period and the second period being overlapped, a second signal for enabling the first switching elements to be off during the first period except the overlapped period, a third signal for enabling the second switching elements to be off during the second period except the overlapped period.

In the image detecting device according to the present invention, the first switching element and the second switching element are synchronously driven so that the first on period of the first switching element overlaps with the second on period of the second switching element. Thus, the number of pixels that detect a moving picture at a time becomes large. Consequently, the frame rate of the detected image can be increased. Thus, the state of an object can be detected as a moving picture.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, embodiments of the present invention will be described.

(First Embodiment)

Figure 1:
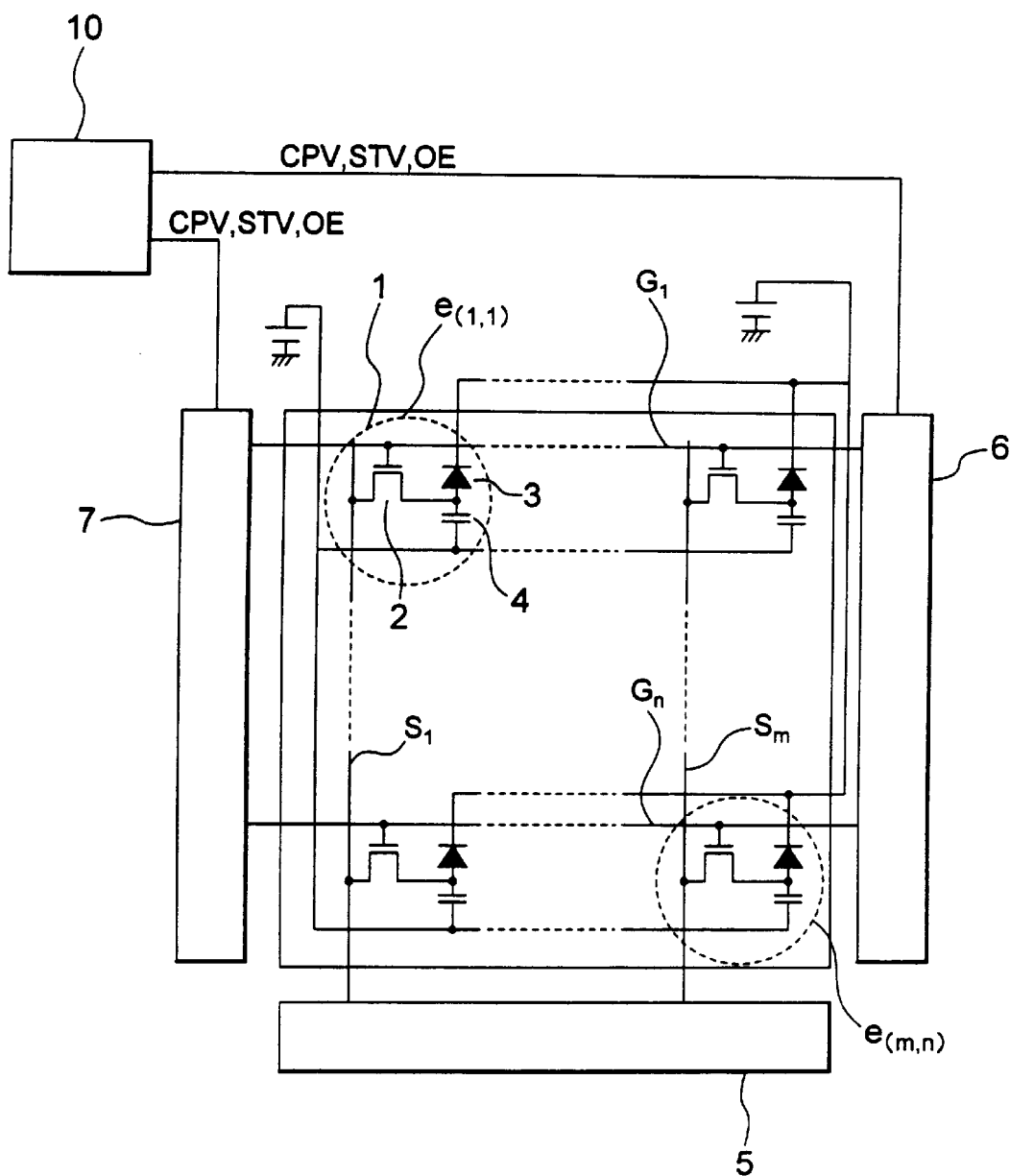
FIG. 1 is a circuit diagram showing an example of the structure of an image detecting device according to a first embodiment of the present invention.

FIG. 1 is a circuit diagram showing an example of the structure of an image detecting device according to a first embodiment of the present invention.

In FIG. 1, on a TFT array 1, pixels e (m, n), signal lines Sm, and scan lines Gn are disposed. Each of the pixels e (m, n) is composed of a TFT 2, a photoelectric film 3, and a pixel capacitor 4.

A detecting amplifier 5 and two scan line driving circuits 6 and 7 are disposed on the TFT array 1 or another substrate 9 (not shown) through an FPC cable 8 or the like (not shown). A first end side of the signal lines Sm is connected to the detecting amplifier 5. A first end side of the scan lines Gn is connected to the scan line driving circuit 6. A second end side of the scan lines Gn is connected to the scan line driving circuit 7. A control signal supplying circuit 10 supplies three types of signals that are a clock signal CPV, a start pulse STV, and an enable signal OE to the scanning line driving circuits 6 and 7.

Figure 2:
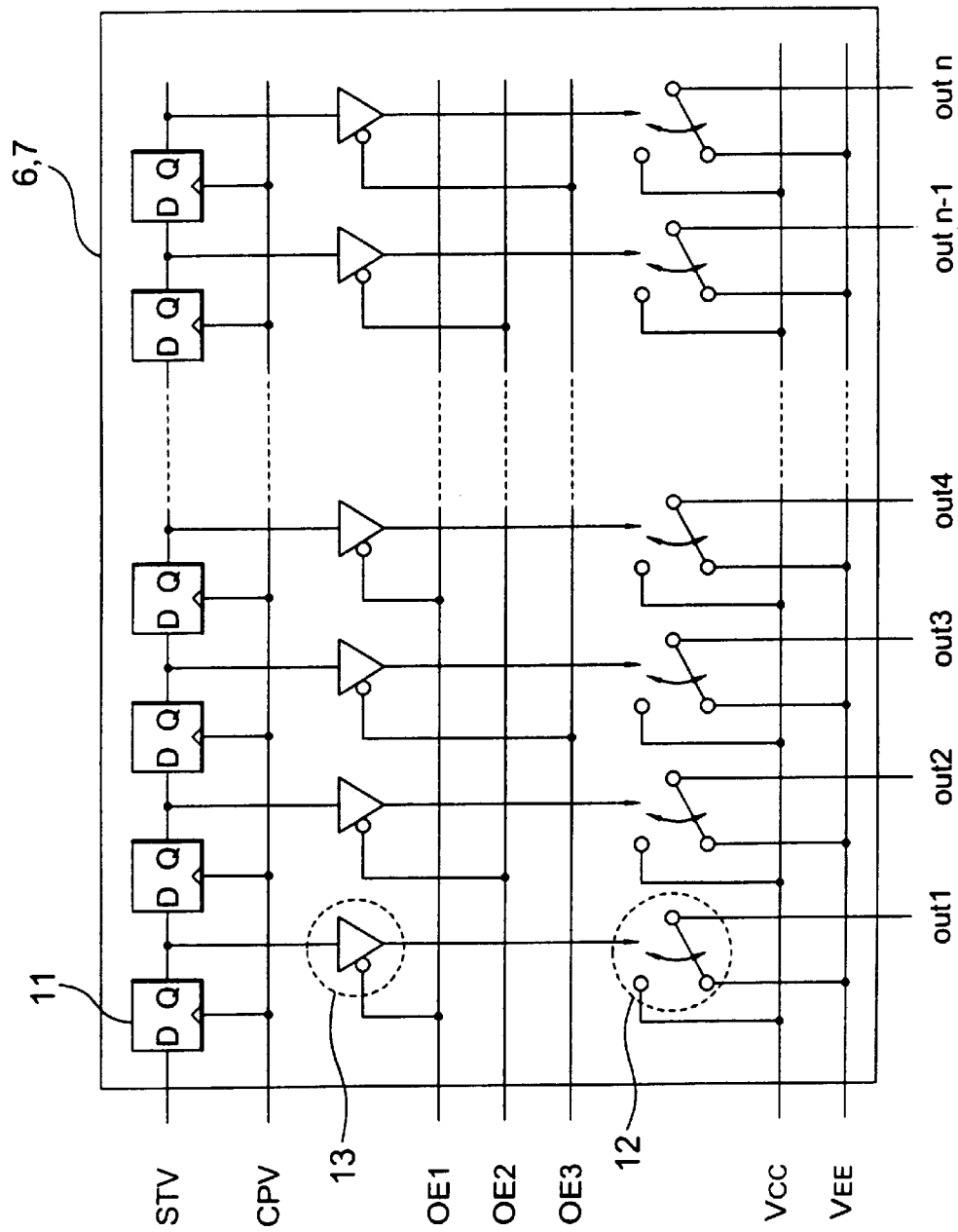
FIG. 2 is a circuit diagram showing an example of the structure of a scan line driving circuit.
Figure 3:
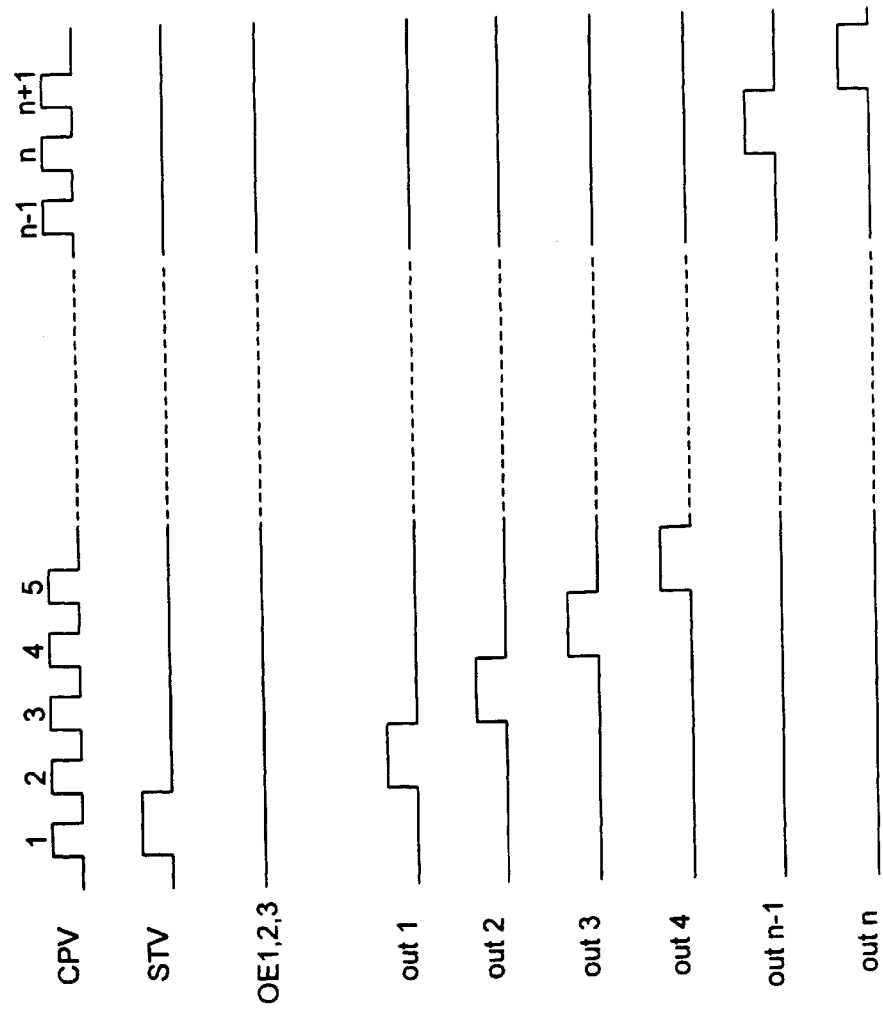
FIG. 3 is a timing chart showing examples of waveforms of output signals of a control signal supplying circuit.

FIG. 2 is a circuit diagram showing the structure of the scan line driving circuits 6 and 7. FIG. 3 is a timing chart showing waveforms of the clock signal CPV, the start pulse STV, and the enable signal OE that are output from the control signal supplying circuit 10.

Each of the scan line driving circuits 6 and 7 is composed of shift registers 11, selection switches 12 (or output buffers), and selection controlling circuits 13. The number of the shift registers 11, the number of the selection switches 12, and the number of the selection controlling circuits 13 each are equal to the number of output lines. Signals CPV, STV, and OE that are supplied from a control signal supplying circuit 10 become a clock signal and input data of shift resisters 11, and an enable signal of the selection controlling circuits 13, respectively. Each of the selection switches 12 selects either a power supply voltage $V_{CC}$ (gate-on voltage) or a power supply voltage $V_{EE}$ (gate-off voltage) corresponding to an output signal of the relevant shift register 11 and outputs the selected voltage to the relevant scan line Gn. The enable signal OE causes the relevant selection switch 12 to select the power supply voltage $V_{EE}$. With the enable signal OE, all output signals may be controlled. Alternatively, with several OE signals, output signals may be alternately controlled (in FIG. 2, with three OE signals, output signals are alternately controlled).

In the embodiment, when the control signals CPV, STV, and OE supplied to the scan line driving circuit 6 are the same as those supplied to the scan line driving circuit 7 as shown in FIG. 3, the scan line driving circuits 6 and 7 can drive the same scan line. Thus, the length of the scan liens is substantially halved. In other words, the influence against signal delays and waveform distortion due to the line resistance and line capacitance can be alleviated. Thus, an image detecting device with a large screen, a high resolution, and a high frame rate can be accomplished. Consequently, a moving object can be detected as a moving picture.

In the embodiment, the photoelectric film 3 is disposed on each pixel electrode (not shown). Alternatively, the photoelectric film 3 may be layered on the entire TFT array rather than each separated pixel electrode. The TFT 2 may be composed of one of a-Si, p-Si, and c-Si. When the TFT 2 is composed of p-Si or c-Si, the scan line driving circuits 6 and 7 can be integrally structured with the TFT array. Such a structure can be applied to other embodiments of the present invention.

(Second Embodiment)

Figure 4:
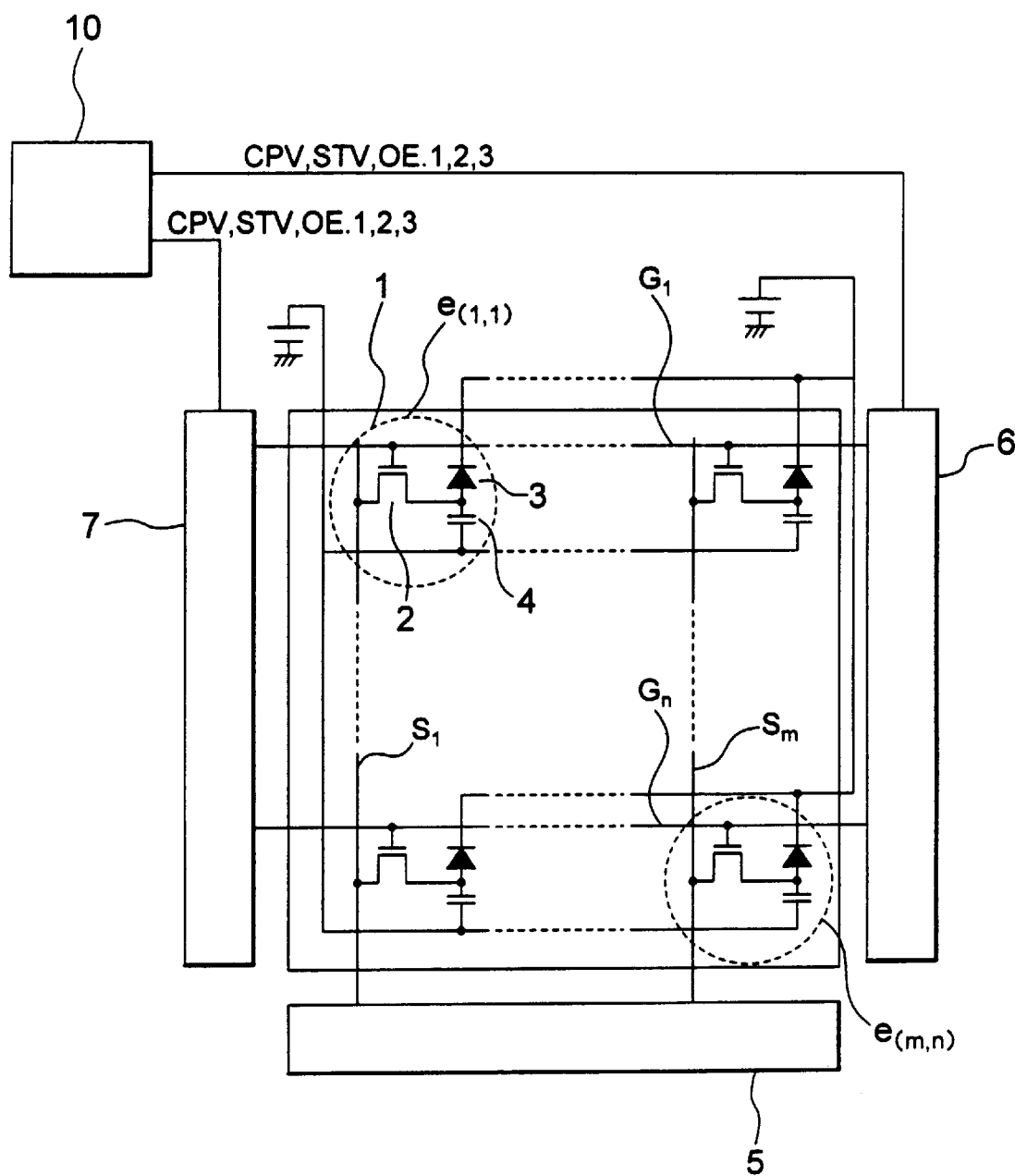
FIG. 4 is a circuit diagram showing an example of the structure of an image detecting device according to a second embodiment of/the present invention.

FIG. 4 is a circuit diagram showing an example of the structure of an image detecting device according to a second embodiment of the present invention. The fundamental structure and operation of the image detecting device according to the second embodiment are the same as those according to the first embodiment. Thus, for simplicity, in FIG. 4, similar portions to those in FIG. 1 are denoted by similar reference numerals and their description will be omitted.

In FIG. 4, on a TFT array 1, pixels e (m, n), signal lines Sm, and scan lines Gn are disposed. Each of the pixels e (m, n) is composed of a TFT 2, a photoelectric film 3, and a pixel capacitor 4.

A detecting amplifier 5 and two scan line driving circuits 6 and 7 are disposed on the TFT array 1 or another substrate 9 (not shown) through an FPC cable 8 or the like (not shown). A first end side of the signal lines Sm is connected to the detecting amplifier 5.

A first end side of the scan lines Gn is connected to the scan line driving circuit 6. A second end side of the scan lines Gn is connected to the scan line driving circuit 7.

As with the first embodiment, each of the scan line driving circuits 6 and 7 is composed of shift registers 11, selection switches 12 (or output buffers), and selection controlling circuits 13 shown in FIG. 2. Each of the selection controlling circuit 13 controls the relevant selection switch 12. The number of the shift resisters 11, the number of the selection switches 12, and the number of the selection controlling circuits 13 each are equal to the number of output lines. Signals CPV, STV, and OE that are supplied from a control signal supplying circuit 10 become a clock signal and input data of shift registers 11, and an enable signal of the selection controlling circuits 13, respectively. Each of the selection switches 12 selects either a power supply voltage $V_{CC}$ (gate-on voltage) or a power supply voltage $V_{EE}$ (gate-off voltage) corresponding to an output signal of the connected shift register 11 and supplies the selected power supply voltage to the connected scan line Gn. The enable signal OE causes the selection switch 12 to output the power supply voltage $V_{EE}$. The enable signal OE may control all output signals. Alternatively, several enable signals OE control respective output signals (in FIG. 4, three enable signals OE control respective output signals).

Figure 5:
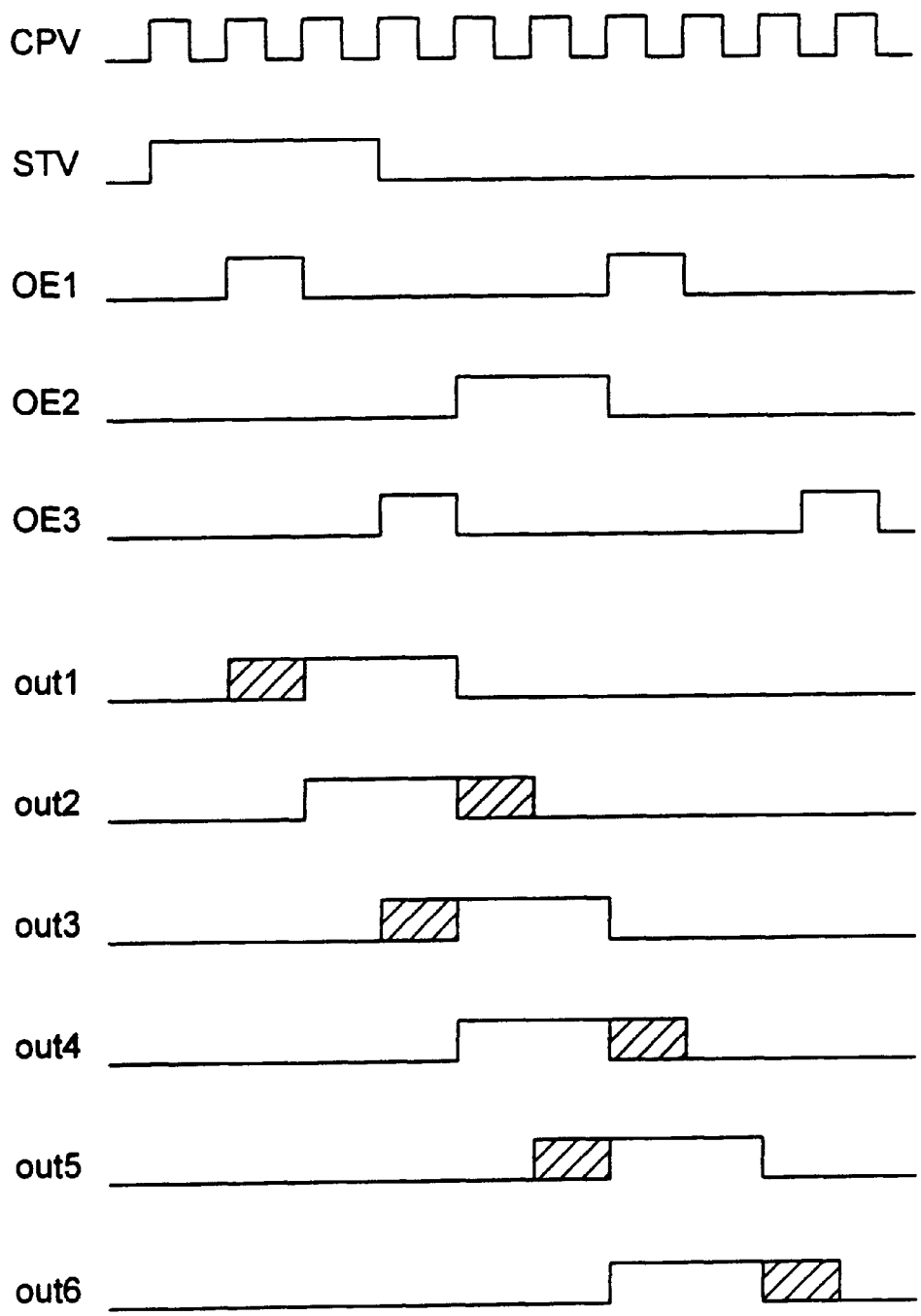
FIG. 5 is a timing chart showing examples of waveforms of output signals of the control signal supplying circuit and the scan line driving circuit.
Figure 6:
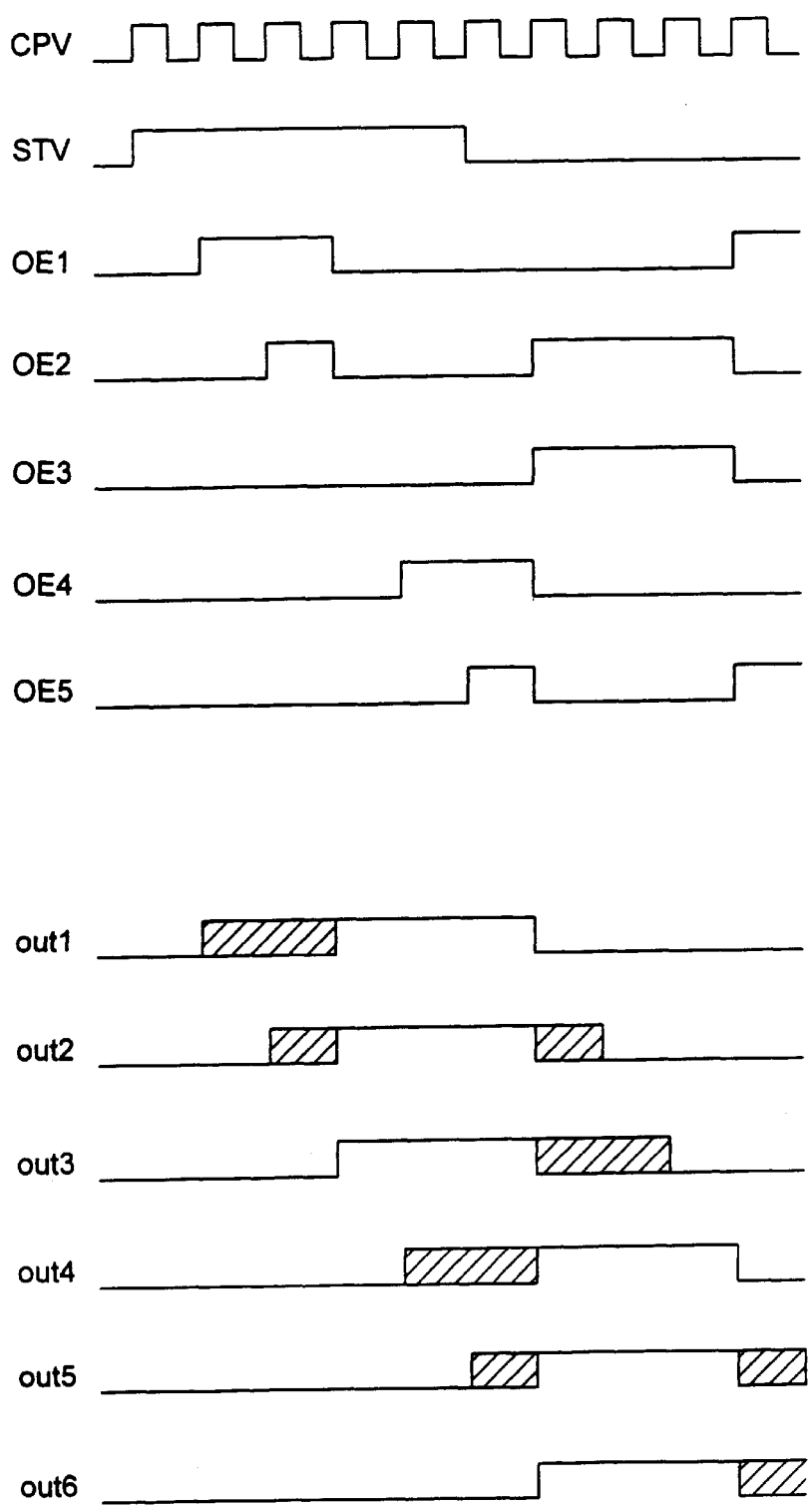
FIG. 6 is a timing chart showing examples of waveforms of output signals of the control signal supplying circuit and the scan line driving circuit.

FIG. 5 is a timing chart showing waveforms of control signals of a control signal supplying circuit and waveform of the scan line driving circuits 6 and 7 in the case that two scan lines are driven at a time (N=2). FIG. 6 is timing chart showing waveforms of control signals of a control signal supplying circuit and waveform of the scan line driving circuits 6 and 7 in the case that three scan lines are driven at a time (N=3). When two scan lines are driven at a time, the start pulse STV is input for a period of 2N−1=3 clock pulses to the scan line driving circuits 6 and 7. Thus, output signals (denoted by "H" portions including the hatched portions shown in FIG. 5) of the scan line driving circuits 6 and 7 are shifted by one clock pulse per scan line. Thus, the gate-on voltage $V_{CC}$ is output for three clock pulses. At this point, the enable signal OE causes the gate-on voltage $V_{CC}$ to be output only in a period of which two scan lines are being selected. Thus, three enable signals OE1, OE2, and OE3 are arranged as shown in FIG. 5. As is clear from FIG. 5, when N scan lines are driven at a time, at least (2N−1) enable signals OE are required.

When signals shown in FIGS. 5 and 6 are supplied to scan lines, the scan line selection period can be prolonged to two or three clock periods. Thus, the influence against signal delays and waveform distortion can be alleviated. Consequently, an image detecting device with a high frame rate can be accomplished. In this embodiment, the scan line driving circuits 6 and 7 are connected to both sides of scan lines so as to drive a plurality of scan lines at a time. Thus, the influence against signal delays and waveform distortion can be further alleviated.

In this driving method, since N scan lines are driven at a time, the detecting amplifier 5 detects a signal of which N pixel signals are added. The controlling signal supplying circuit 10 drives N scan lines at a time with the control signals CPV, STV, and OE. In addition, the control signal supplying circuit 10 supplies a signal add to the detecting amplifier 5 so as to control the number of signal lines added by the detecting amplifier 5.

Figure 7:
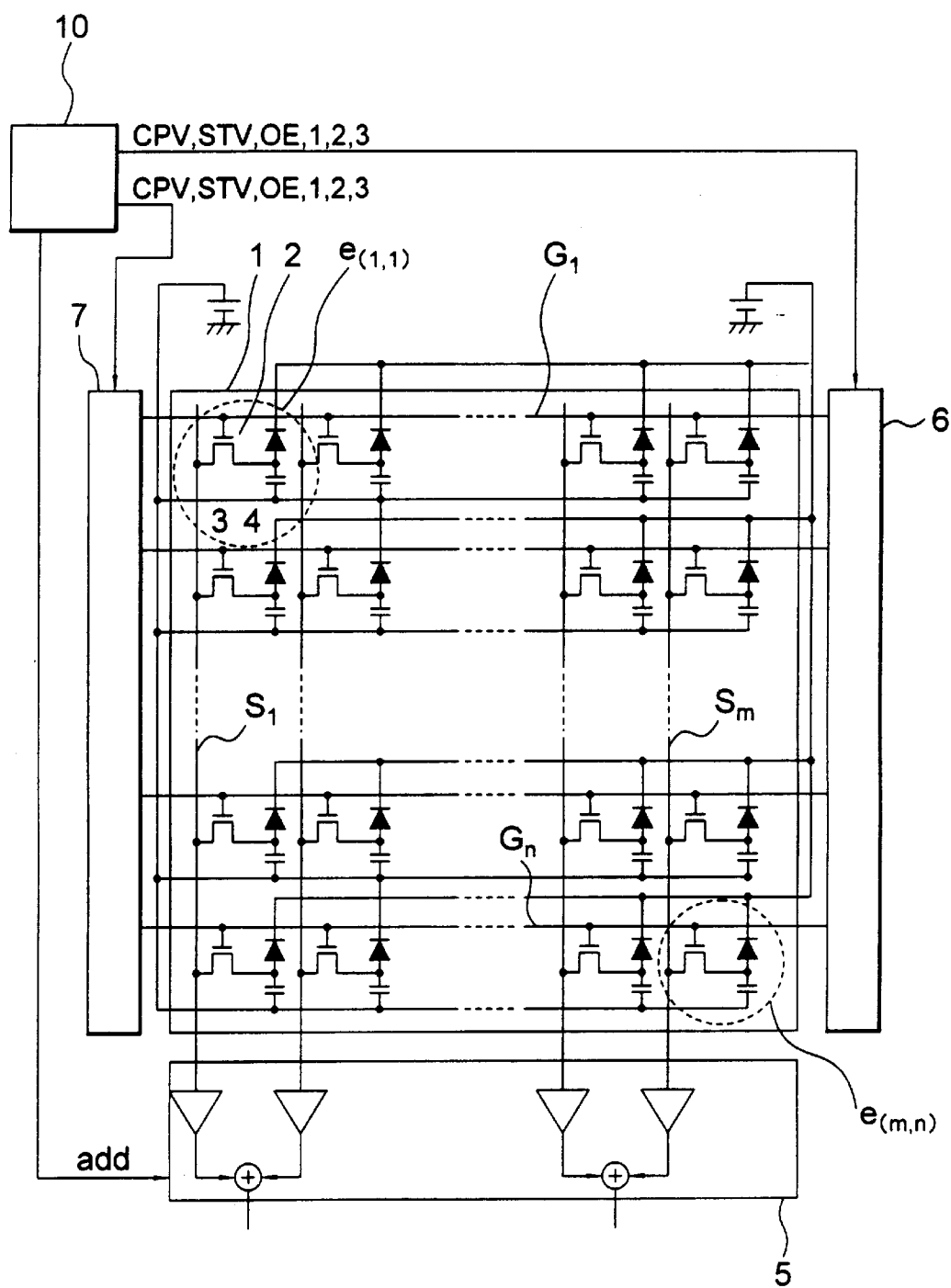
FIG. 7 is a circuit diagram showing an example of the structure of an image detecting device according to the present invention.

As shown in FIG. 7, since signals of N signal line amplifying circuits 5 are added (in FIG. 6, N=2), an adding process for a square lattice of N×N pixels is performed. Thus, an image that is output to a monitor or the like can be prevented from distorting.

(Third Embodiment)

Figure 8:
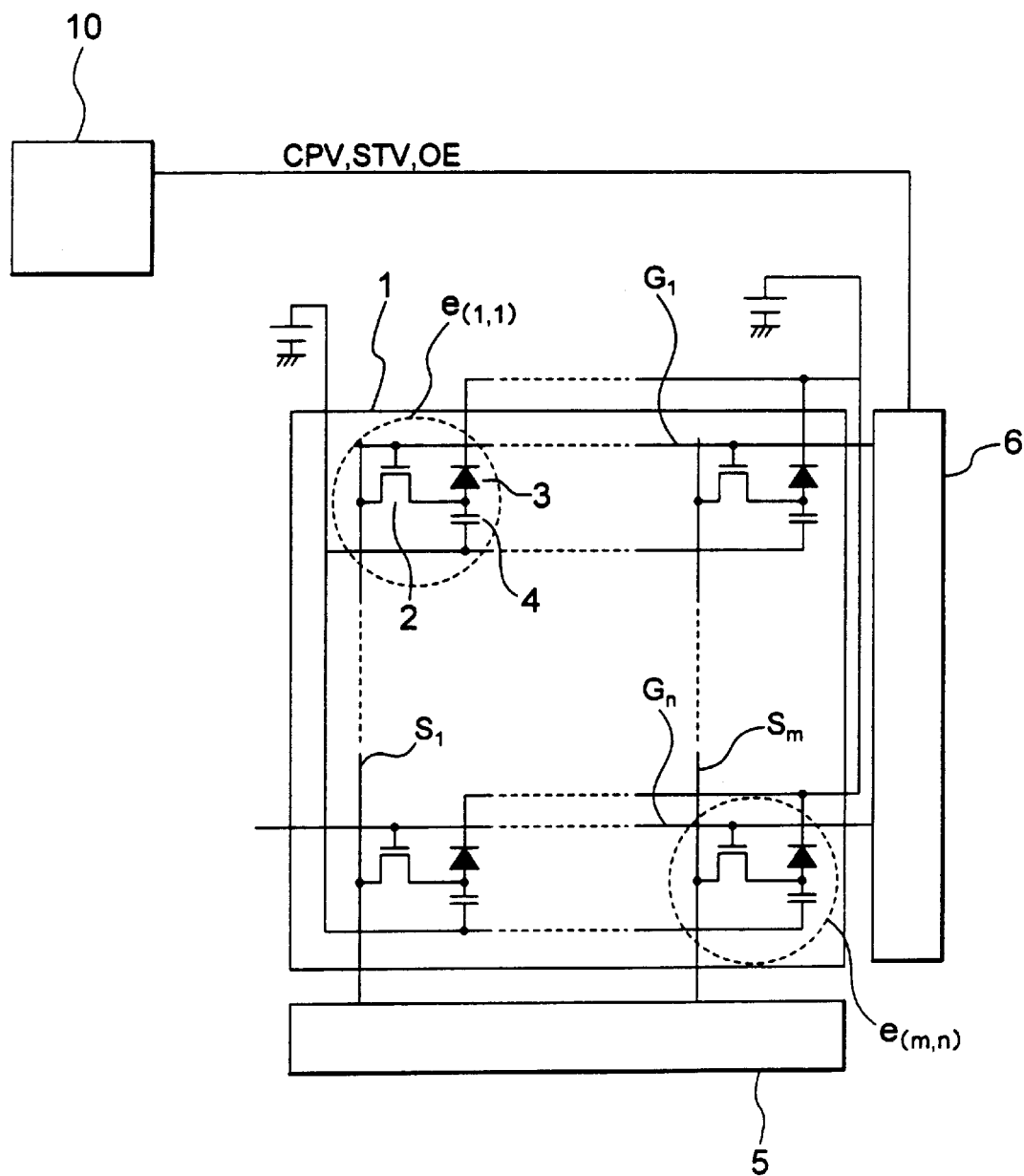
FIG. 8 is a circuit diagram showing an example of the structure of an image detecting device according to a third embodiment of the present invention.

FIG. 8 is a circuit diagram showing an example of the structure of an image detecting device according to a third embodiment of the present invention. The fundamental structure and operation of the image detecting device according to the third embodiment are the same as those according to the first embodiment. For simplicity, in FIG. 8, similar portions to those in FIG. 1 are denoted by similar reference numerals and their description will be omitted.

In the third embodiment, the scan line driving circuit 6 of the second embodiment is connected to the first end side of the scan lines. As with the second embodiment, in the third embodiment, the period for selecting one scan line becomes long. Thus, since the influence against signal delays and waveform distortion can be alleviated, an image detecting device with a high frame rate can be accomplished.

(Fourth Embodiment)

Figure 9:
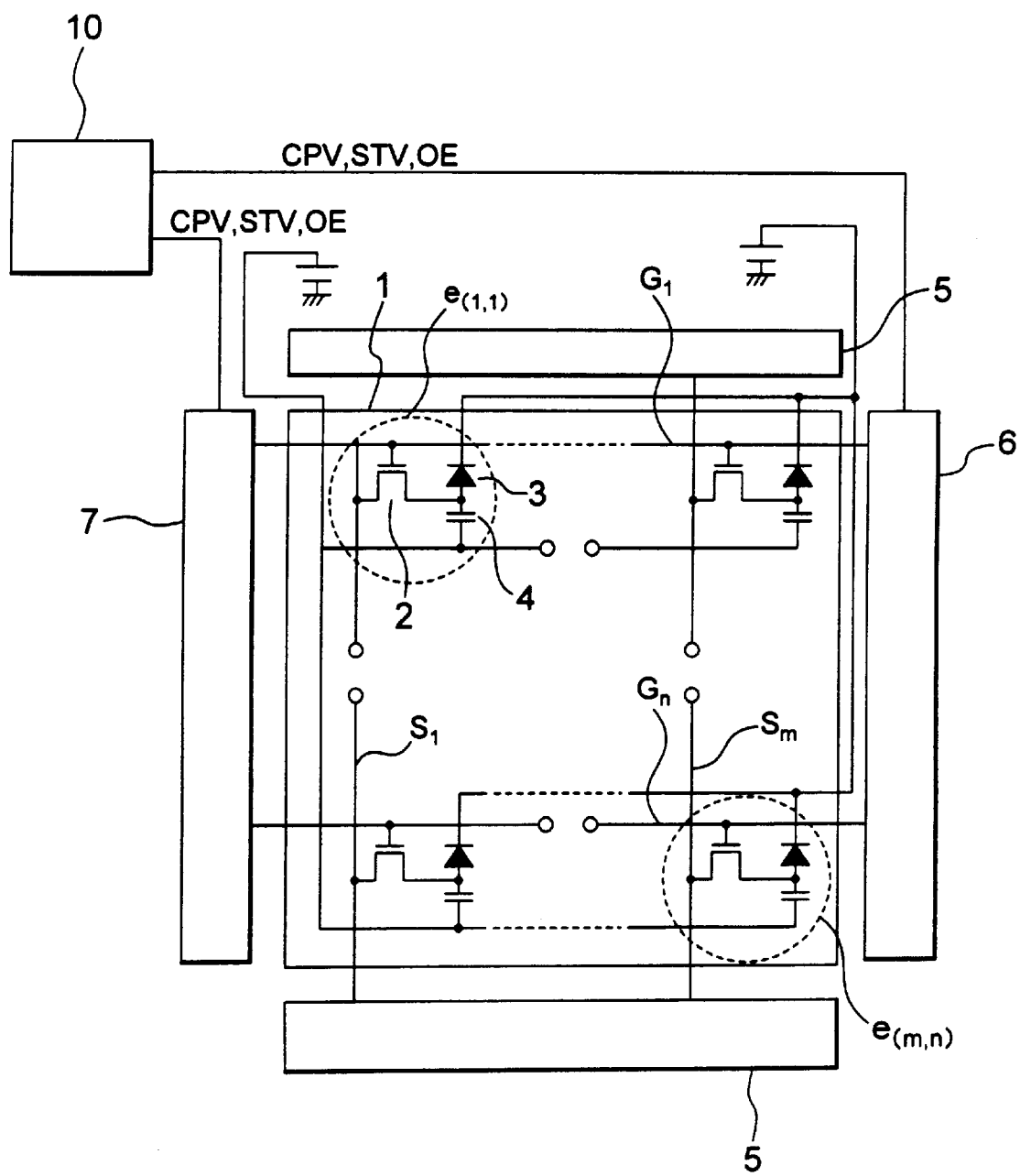
FIG. 9 is a circuit diagram showing an example of the structure of an image detecting device according to a fourth embodiment of the present invention.

FIG. 9 is a circuit diagram showing an example of the structure of an image detecting device according to a fourth embodiment of the present invention. The fundamental structure and operation of the image detecting device according to the fourth embodiment are the same as those according to the first embodiment. Thus, for simplicity, in FIG. 9, similar portions to those in FIG. 1 are noted by similar reference numerals and their description will be omitted.

In the fourth embodiment, the signal lines Sm and the scan lines Gn in the first embodiment are separated horizontally and vertically, respectively. In this case, since the line length of scan lines is halved, the resistance and capacitance of the scan lines are halved. Thus, since the signal delays and waveform distortion of the scan line driving signal can be suppressed, an image detecting device with a large screen, a high resolution, and a high frame rate can be accomplished.

In FIG. 9, both the signal lines Sm and the scan lines Gn are separated and electrically independently driven. However, when only the scan lines are separated, the same effect as the above-described structure can be obtained.

(Fifth Embodiment)

Figure 10:
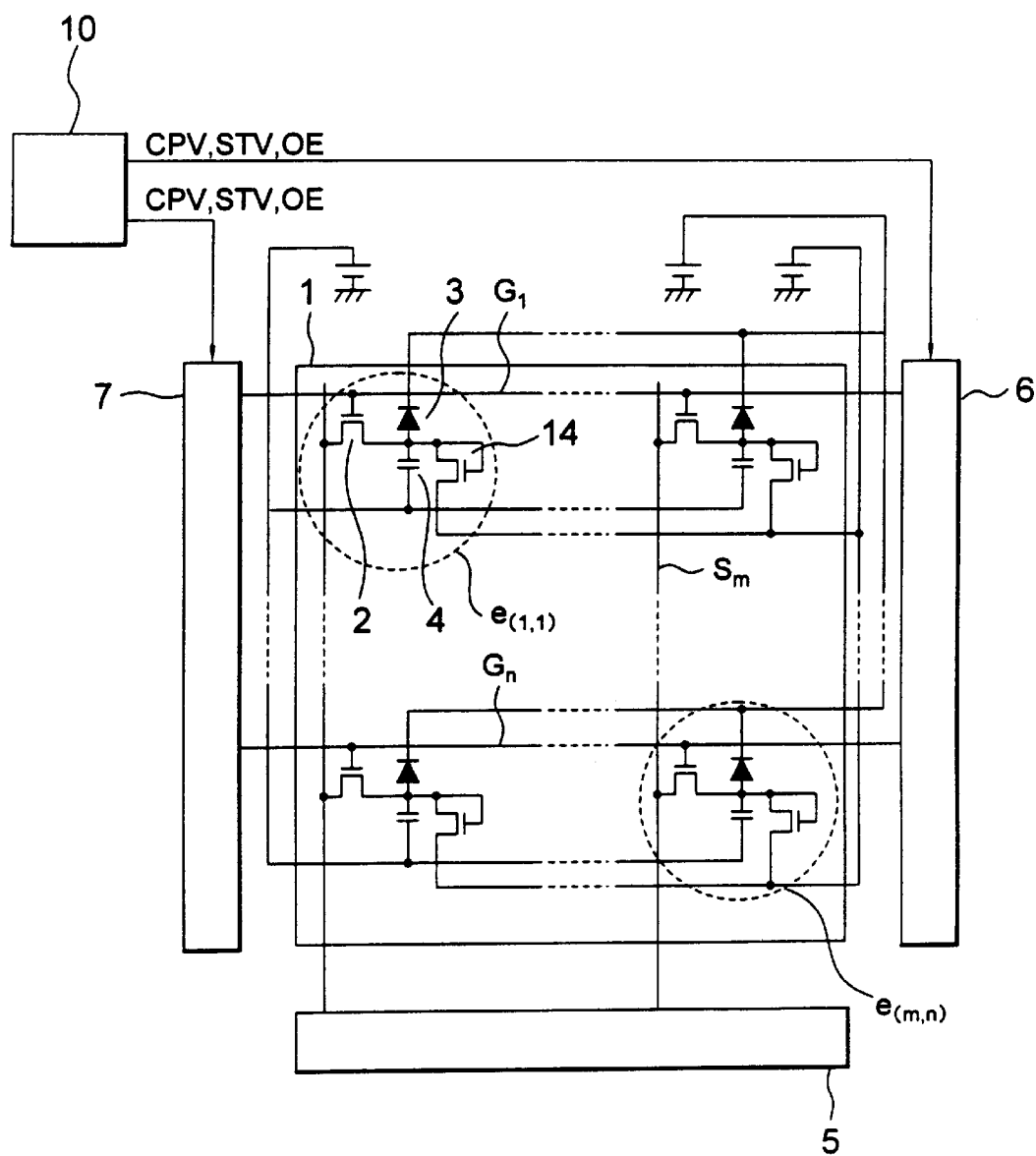
FIG. 10 is a circuit diagram showing an example of the structure of an image detecting device according to a fifth embodiment of the present invention.

FIG. 10 is a circuit diagram showing an example of the structure of an image detecting device according to a fifth embodiment of the present invention. The fundamental structure and operation of the image detecting device according to the fifth embodiment are the same as those according to the first embodiment. Thus, for simplicity, in FIG. 10, similar portions to those in FIG. 1 are denoted by similar reference numerals and their description will be omitted.

In the fifth embodiment, a protecting diode 14 is disposed in each pixel of the first embodiment. The protecting diode 14 prevents the pixel voltage due to stored electric charge from rising. Thus, dielectric breakdown can be prevented in the TFT and so forth.

Since the protecting diode 14 is disposed in each pixel, bias lines should be disposed. Thus, the bias lines intersect with scan lines. Consequently, since the capacitance of the scan lines increases, the load to the scan lines becomes large.

Since the scan lines are driven on both sides as shown in FIG. 10, the resistance and capacitance of the scan lines are apparently halved. Thus, even if a protecting diode is disposed in each pixel, an image detecting device with a large screen, a high resolution, and a high frame rate can be accomplished.

The method for forming a protecting diode in each pixel can be applied to each of the above-described embodiments.

(Sixth Embodiment)

Figure 11:
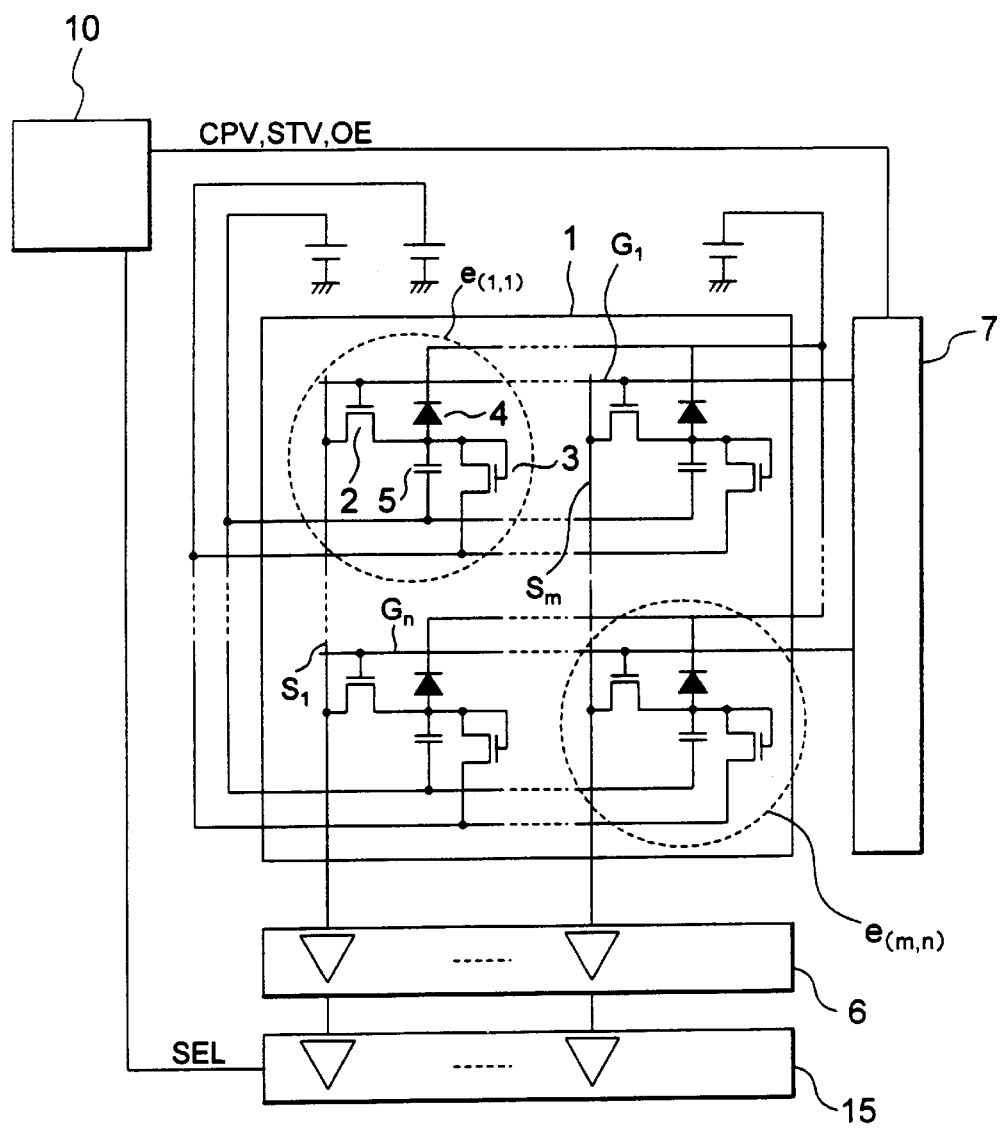
FIG. 11 is a circuit diagram showing an example of the structure of an image detecting device according to a sixth embodiment of the present invention.

FIG. 11 is a circuit diagram showing an example of the structure of an image detecting device according to a sixth embodiment of the present invention.

In FIG. 11, on a TFT array 1, pixels e (m, n), signal lines Sm, and scan lines Gn are disposed. Each of the pixels e (m, n) is composed of a TFT 2, a protecting diode 3, a photoelectric film 4, and a pixel capacitor 5. A detecting amplifier 6 and a scan line driving circuit 7 are disposed on the TFT array 1 or another substrate 9 (not shown) through an FPC cable 8 or the like (not shown). A detecting amplifier 6 is connected to the signal lines Sm. A gain selecting circuit 15 is connected to the next stage of the detecting amplifier 6.

Although an A/D converter 19 (not shown) is disposed on the next stage of the gain selecting circuit 15, an offset adjusting circuit or another functional circuit may be disposed between the detecting amplifier 6 and the A/D converter 19. A scan line driving circuit 7 is connected to the scan lines Gn. A control signal supplying circuit 10 supplies three types of signals that are a clock signal CPV, a start pulse SV, and an enable signal OE to the scan line driving circuit 7 so as to set an image detecting mode. In addition, the control signal supplying circuit 10 supplies a selection signal SEL to the gain selecting circuit 15 so as to set a proper amplification factor.

When an X-ray is radiated to a pixel, a current flows in the photoelectric film 4 of the pixel. Thus, electric charge is stored in the pixel electrode 5 of the pixel. After a predetermined time period has elapsed, the scan line driving circuit 7 turns on the TFT 2. Thus, the TFT 2 causes the stored electric charge to flow to the detecting amplifier 6. When the dose of the X-ray is large and the voltage of the pixel exceeds a predetermined voltage, the protecting diode 3 is turned on. Thus, the protecting diode 3 discharges unnecessary electric charge. Unlike with the conventional method using a dielectric layer, in the structure shown in FIG. 10, no discharging period is required. Since electric charge of each pixel can be read on real time basis, an image detecting device with a high frame rate necessary for the penetration mode can be accomplished.

FIG. 2 shows the structure of the scan line driving circuit 7. The scan line driving circuit 7 is composed of shift registers 11, selection switches 12 (or output buffers), and selection controlling circuits 13. The number of the shift registers 11, the number of the selection switches 12, and the number of the selection controlling circuits 15 each are equal to the number of output lines. The control signals CPV, STV, and OE that are supplied from the controlling signal supplying circuit 10 in FIG. 11 become a clock signal and input data of the shift registers 11, and an enable signal of the selection controlling circuit 13, respectively. Each of the selection switches 12 selects either a power supply voltage $V_{CC}$ (gate-on voltage) and a power supply voltage $V_{EE}$ (gate-off voltage) corresponding to the output signal of the connected shift register 11 and supplies the selected power supply voltage to the relevant scan line Gn. The enable signal OE causes the selection switch 12 to select the power supplying voltage $V_{EE}$. With one enable signal OE, all output signals may be controlled. Alternatively, with several OE signals, output signals may be alternately controlled (as shown in FIG. 2, where three OE signals, output signals are alternately controlled).

Figure 12:
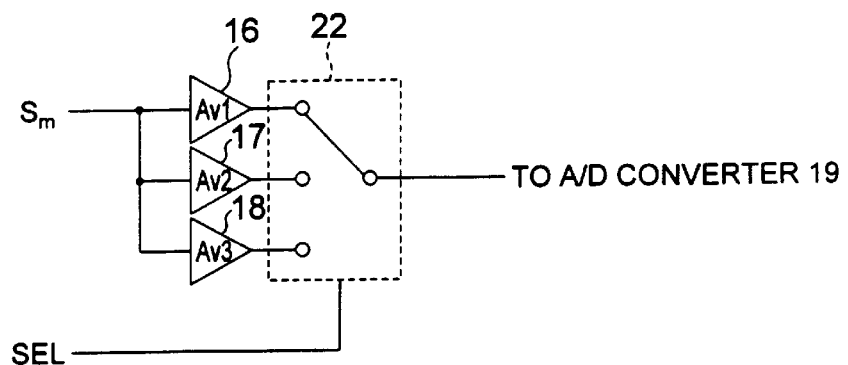
FIG. 12 is a circuit diagram showing the structure of a gain selecting circuit.

FIG. 12 is a circuit diagram showing the structure of the gain selecting circuit 15 shown in FIG. 11. A switch 22 selects one of an image detecting mode amplifier 16, a DA mode amplifier 17, and a DSA mode amplifier 18 whose amplification factors vary corresponding to those modes.

Thus, according to the embodiment, the control signal supplying circuit 10 supplies the drive signals CPV, STV, and OE to the scan line driving circuit 7 corresponding to the selected image detecting mode. In addition, the control signal supplying circuit 10 supplies the selection signal SEL to the gain selecting circuit 15. Thus, a detection signal with a proper amplitude is supplied to the A/D converter 19. Consequently, the dynamic range of the A/D converter 19 can be effectively used. Thus, even in an image detecting mode such as the penetration mode in which the dose of an X-ray is small, the dynamic range of the A/D converter 19 can be effectively used. Thus, it is expected that the S/N ratio of a detected image will be improved.

In the embodiment, the photoelectric film 4 is disposed on each pixel electrode (not shown). Alternatively, the photoelectric film 4 may be layered on the entire TFT array rather than each pixel electrode. The TFT 2 may be composed of a-Si, p-Si, or c-Si. When the TFT 2 is composed of p-Si or c-Si, the scan line driving circuit 7 can be integrally structured with the TFT array. In the embodiment, the direct converting type X-ray image detecting device was described. However, when the embodiment is applied to an indirect converting type X-ray image detecting device composed of scintillator and a photoelectric film, any driving mode such as DA, DSA and penetration mode can be used. This structure can be applied to other embodiments of the present invention.

(Seventh Embodiment)

Figure 13:
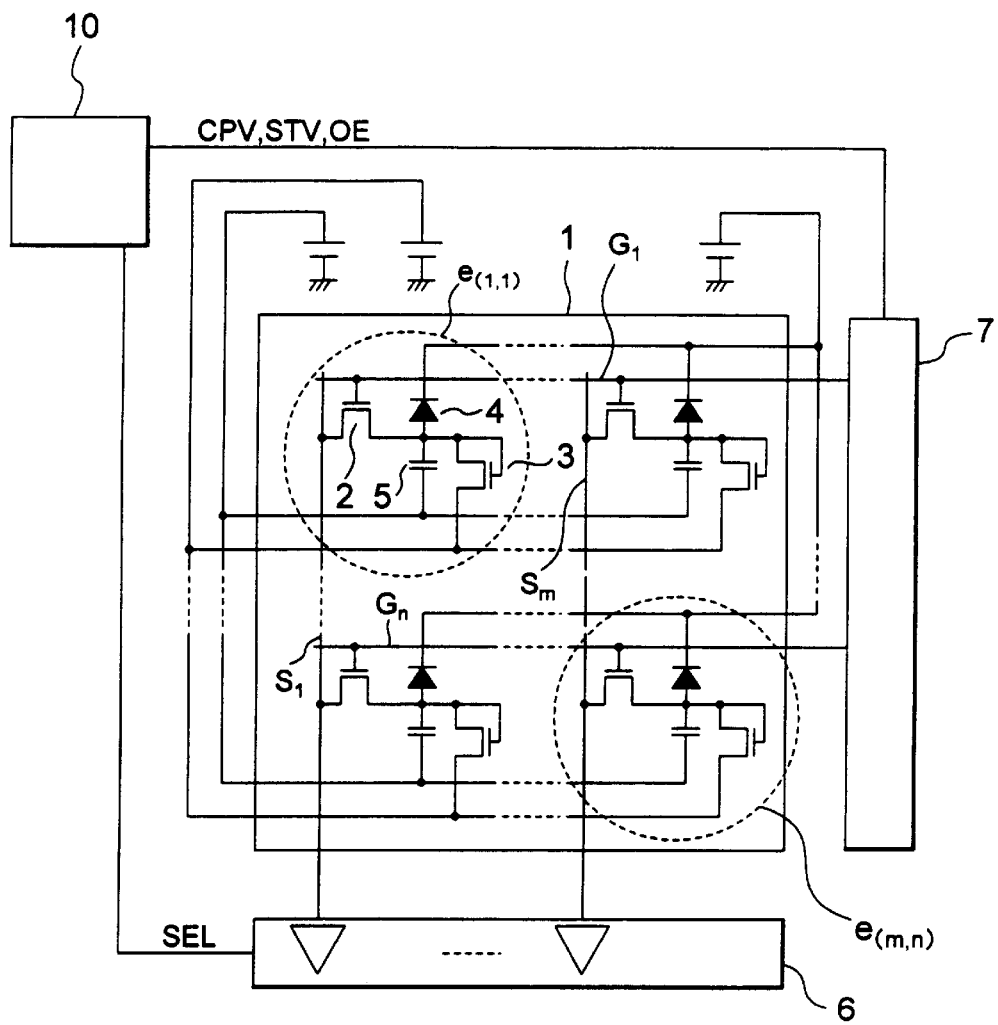
FIG. 13 is a circuit diagram showing an example of the structure of an image detecting device according to a seventh embodiment of the present invention.

FIG. 13 is a circuit diagram showing an example of the structure of an image detecting device according to a seventh embodiment of the present invention. The fundamental structure and operation of the image detecting device according to the seventh embodiment are the same as those according to the sixth embodiment. Thus, for simplicity, in FIG. 13, similar portions to those in FIG. 11 are noted by similar reference numerals and their description will be omitted.

In FIG. 13, on a TFT array 1, pixels e (m, n), signal lines Sm, and scan lines Gn are disposed. Each of the pixels e (m, n) is composed of a TFT 2, a protecting diode 3, a photoelectric film 4, and a pixel capacitor 5. A detecting amplifier 6 and a scan line driving circuit 7 are disposed on the TFT array 1 or another substrate 9 (not shown) through an FPC cable 8 or the like (not shown). A detecting amplifier 6 is connected to the signal lines Sm. An A/D converter 19 is disposed on the next stage of the detecting amplifier 6. A gain adjusting circuit, an offset adjusting circuit, or another functional circuit may be disposed between the detecting amplifier 6 and the A/D converter 19. The scan line driving circuit 7 is connected to the scan lines Gn. A control signal supplying circuit 10 supplies three types of signals that are a clock signal CPV, a start pulse STV, and an enable signal OE to the scan line driving circuit 7 so as to set an image detecting mode of the image detecting device. In addition, the control signal supplying circuit 10 supplies a selection signal SEL to the detecting amplifier 6 so as to set a proper amplification factor.

Figure 14:
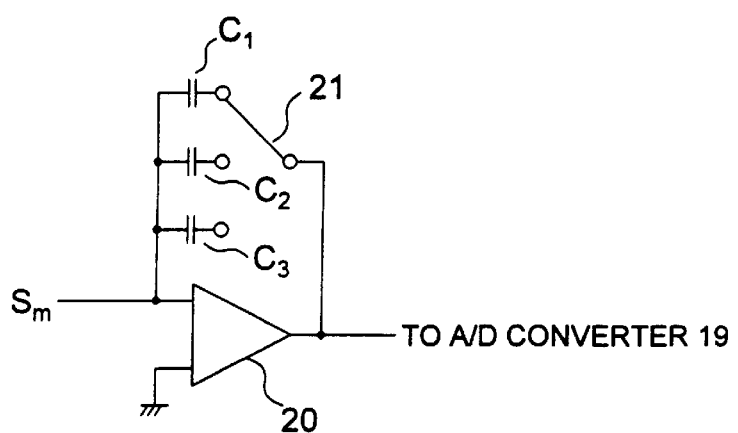
FIG. 14 is a circuit diagram showing the structure of a detecting amplifier.

FIG. 14 is a circuit diagram showing the structure of the detecting amplifier 6. The detecting amplifier 6 is an integrating amplifier composed of an amplifier 20, a plurality of capacitors C1, C2, and C3, and a selection switch 21. The capacitor C1, C2, or C3 is selected corresponding to the image detecting mode so as to adjust an output signal of the integrating amplifier. An output signal Vout of the integrating amplifier is represented by $V_{out}=Q/C$. Since the amount of electric charge Q in the penetration mode is smaller than that in the DSA mode by three digits, when the capacitance of the capacitor in the penetration mode is smaller than that in the DSA mode by three digits, the output voltage of the integrating amplifier can be equalized. Since it is difficult to finely adjust the capacitance, when the gain selecting circuit 15 of the sixth embodiment is disposed on the next stage of the detecting amplifier, the gain can be finely adjusted.

As with the sixth embodiment, the control signal supplying circuit 10 supplies the drive signals CPV, STV, and OE to the scan line driving circuit 7 corresponding to the image detecting mode. In addition, the control signal supplying circuit 10 supplies the selection signal SEL to the detecting amplifier 6. Thus, a detection signal with a proper amplitude is supplied to the A/D converter 19. Consequently, the dynamic range of the A/D converter 19 can be effectively used. Thus, it is expected that the S/N ratio of a detected image will be improved.

(Eighth Embodiment)

Figure 18:
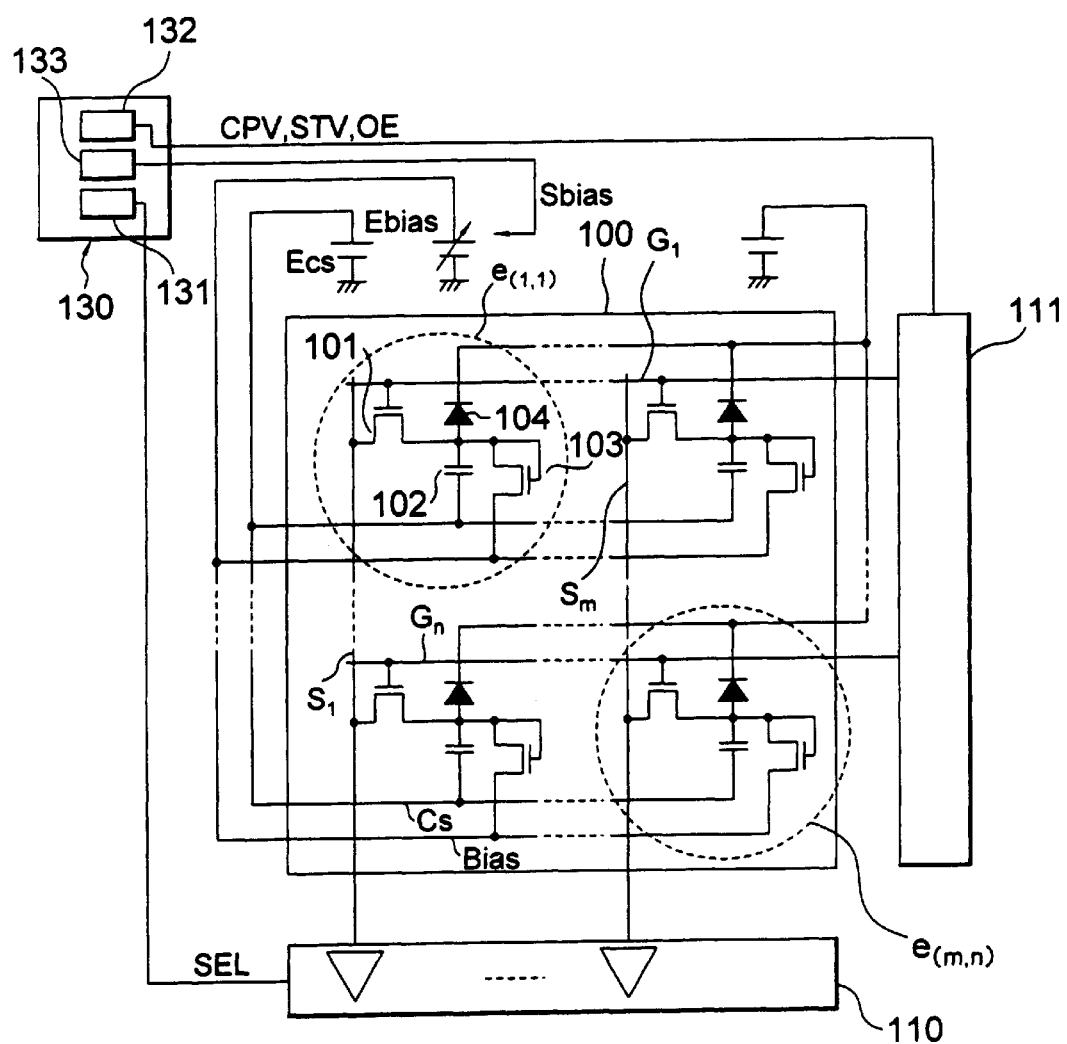
FIG. 18 is a circuit diagram showing an example of the structure of an image detecting device according to an eighth embodiment of the present invention.

FIG. 18 is a circuit diagram showing an example of the structure of an image detecting device according to an eighth embodiment of the represent invention.

Referring to FIG. 18, on an a-S TFT array 100, pixels e (m, n), signal lines Sm, scan lines Gn, capacitor lines Cs, and bias lines Bias are disposed. Each of the pixels e (m, n) is composed of an electric charge reading a-Si TFT 101, a capacitor 102, a protecting diode 103, and a photoelectric film 104 (not shown). The capacitor 102 stores electric charge corresponding to the intensity of light entered to the relevant pixel. The protecting diode 103 protects the relevant pixel against a high voltage. A detecting amplifier 110 and a scan line driving circuit 111 are disposed on the TFT array 100 or another substrate 121 (not shown) through an FPC cable 120 or the like (not shown).

The capacitor line Cs and the bias line Bias are connected to power supplies Ecs and Ebias, respectively. The detecting amplifier 110 and the scan line driving circuit 111 are connected to the signal lines Sm and the scan lines Gn, respectively.

A controller 130 has a detection controlling system 131, a scan line controlling system 132, and a bias voltage controlling system 133. The detection controlling system 131 controls the detection timing and the amplification factor of the detecting amplifier 110. The scan line controlling system 132 controls the scan line driving timing of the scan line driving circuit 111. The bias voltage controlling system 133 adjusts the voltage of the bias line power supply Ebias. In the controller 130, the detecting controlling system 131, the scan line controlling system 132, and the bias voltage controlling system 133 are integrally structured. A part or all of these controlling systems may be separately structured from the pixel array 100. Alternatively, they may be integrally structured with the pixel array 100.

Figure 25:
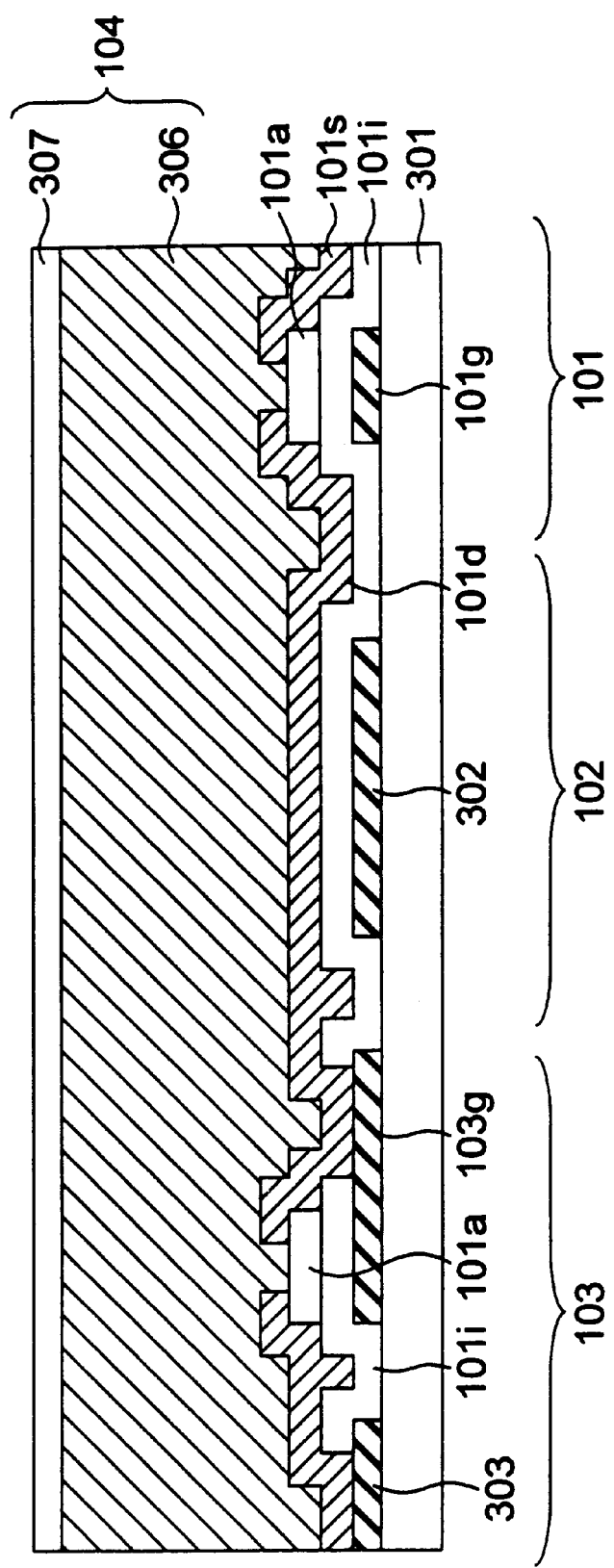
FIG. 25 is a sectional view showing an example of the structure of each pixel of an image detecting device according to the present invention.

FIG. 25 is a sectional view showing an example of the structure of each pixel of the image detecting device according to the present invention.

A thin film transistor 101, a capacitor 102, and a protecting diode 103 are arranged in a matrix array on a substrate 301. The substrate 301 is composed of glass or resin. On the substrate 301, lines such as a scan line Gn, a signal line Sm, a Cs line (Cs) 302, and a bias line (Bias) 303 are disposed. A scanning signal that causes the thin film transistor to be turned on/off is supplied to the scan line Gn. Electric charge stored in the capacitor is read from the signal line Sm. A predetermined voltage is applied to the capacitor 102 through the Cs line 302. A photoelectric film 306 and a conductor film 307 are disposed on such lines. The conductor film 307 causes a voltage to be applied to the photoelectric film 306. The conductor film 307 is composed of ITO or the like.

A gate electrode 101g of the thin film transistor 101 is connected to the scan line Gn. A drain electrode 101d is connected to a first electrode of the capacitor 102. Reference numeral 101s is a source electrode of the thin film transistor 101. In the protecting diode 103, a gate electrode 103g and a source electrode 103s are connected. When the amount of electric charge stored in the capacitor 102 exceeds a predetermined level, the protecting diode 103 is turned on. Reference numeral 101i is an insulation film such as an silicon oxide film, a silicon nitride film, a silicon acid nitride film, or a lamination thereof. In this example, a channel semiconductor film of the thin film transistor 101 is composed of a-Si (amorphous silicon). Alternatively, the channel semiconductor film may be composed of poly-Si (polycrystal silicon), μc-Si (micro-crystal silicon), or another semiconductor material.

Figure 19:
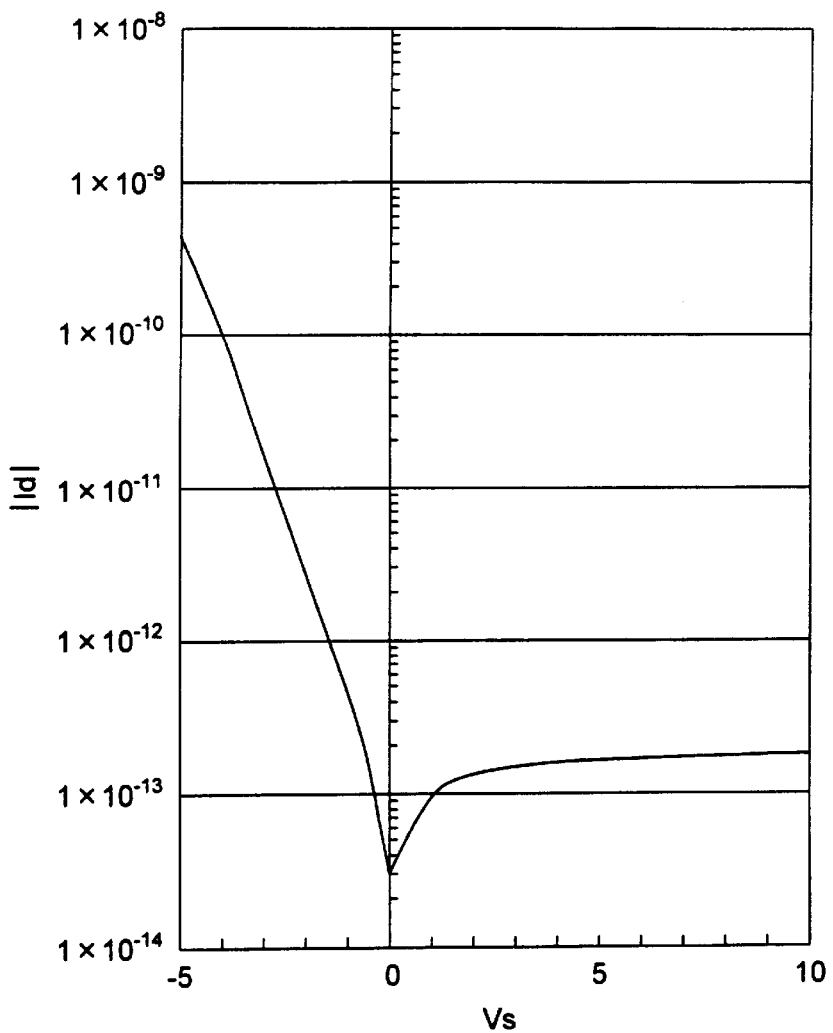
FIG. 19 is a graph showing an example of I–V characteristics of a protecting diode.

FIG. 19 is a graph showing an example of I–V characteristics of the protecting diode 103 that protects the pixel against a high voltage.

Referring to FIG. 19, the horizontal axis represents a voltage Vs applied between the bias line and the pixel electrode. The vertical axis represents a current |Id| (the absolute value of the current Id) that flows between the bias line and the pixel electrode. When Vs>0, Id becomes a leak current.

The amount of electric charge (namely, the voltage of the pixel electrode) in the moving picture mode is smaller than that in the still picture mode by around three digits. Thus, when the value of Vs is adjusted corresponding to the frame rate of the detected image in the moving picture mode (penetration mode) or the still picture mode (DA or DSA mode), the dynamic range of the image can be improved.

In the still picture mode, electric charge of up to 10 pC is stored in each pixel. Since the capacitance of the capacitor 102 of each pixel is around 1 pF, the value of Vs should be adjusted so that the protecting diode is maintained in the off state until the voltage of the pixel electrode becomes around 10 V.

On the other hand, since the frame rate in the moving picture mode is higher than that in the still picture mode, the amount of electric charge stored in each pixel is at most several fC. Thus, even if the v-alue of Vs is set to 10 V, a high voltage protecting funcion can be accomplished.

However, as shown in FIG. 19, at that point, the leak current of the protecting diode 103 is around $2\times10^{-13}$ A. When a moving picture is detected at 30 fps (frames/second), the amount of electric charge stored in the pixel becomes around 6.6 fC due to the leak current. Thus, the amount of the electric charge is almost equal to the level of the detected signal. Consequently, with electric charge stored due to the leak current, the S/N ratio of the detected image deteriorates.

When the capacitance of the capacitor 102 of each pixel is 1 pF, it can be estimated that the voltage of the pixel electrode is up to several mV. Thus, according to the present invention, corresponding to the frame rate, the bias voltage is controlled so that the bias voltage is proportional to the frame rate. In other words, when the frame rate is high, the bias voltage applied to the bias line is lowered. When the frame rate is low, the bias voltage is raised. Thus, in the moving picture mode, the bias voltage is set to a lower level than that in the still picture mode so as to decrease the leak current. Thus, the S/N ratio of the detected image is improved.

When a protecting diode with characteristics shown in FIG. 19 is used, the bias voltage Vs in the moving picture mode is in the range of 1 V>Vs>0 V, preferably in the range of 0.5 V>Vs>0 V, more preferably in the range of 0.1 V>Vs>0 V.

At Vs=0.5 V, Id is around $4\times10^{-14}$ A that is as small as ⅕ in the case of Vs=10 V. Thus, the dynamic range is improved by around 14 dB.

At Vs=0.1 V, the dynamic range is further improved.

Figure 20:
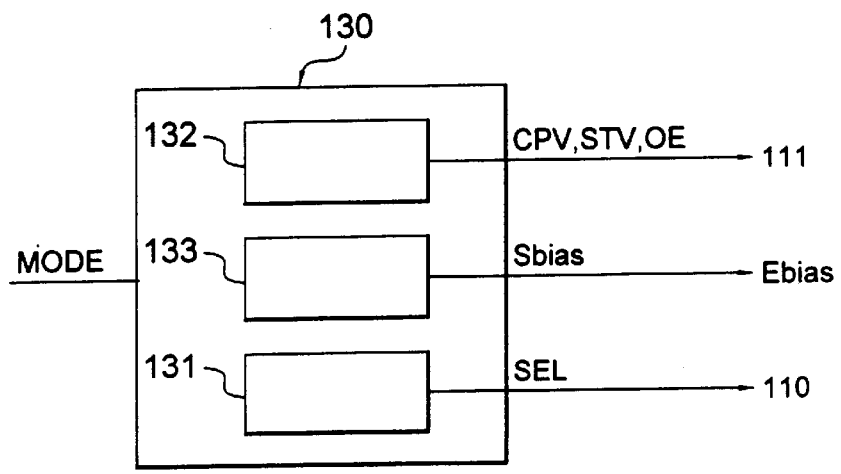
FIG. 20 is a schematic diagram showing an example of the structure of a controller.

FIG. 20 is a schematic diagram showing an example of the structure of the controller 130 that controls the bias line power supply Ebias, the detecting amplifier 110, and the scan line driving circuit 111 corresponding to the dose of light radiated to the photoelectric element of each pixel.

The controller 130 is composed of a detection controlling system 131, a scan line drive controlling system 132, and a bias voltage controlling system 133. The detecting controlling system 131, the scan line drive controlling system 132, and the bias voltage controlling system 133 can be independently controlled. In this example, the pixel signal adding operation will be described.

The pixel signal adding operation is performed mainly in the moving picture mode (where the frame rate is more important than the resolution). By reading pixel signals from a plurality of lines at a time, the frame rate can be improved. The pixel signal adding operation is controlled by the detection controlling system 131 and the scan line drive controlling system 132 in the method according to the second embodiment (see FIG. 5).

When the start pulse (STV) of the scan line driving circuit is maintained in the "H" state for a period of (2N−1), N lines can be driven at a time. In this example, the case of N=2 is described.

In the detecting amplifier, pixel signals of N channels are added. In other words, when only pixel signals in the direction of the scan lines are added, the aspect ratio deviates. Thus, pixel signals in both the direction of signal lines and the direction of the scan lines are added at a time. At the point, the bias line power controlling means 133 supplies a control signal Sbias to the bias line power supply Ebias so that the voltage of the bias line becomes for example 0.5 V.

Thus, the voltage of the bias line can be freely adjusted with the control signal Sbias. Consequently, the voltage of the bias line can be optimally set corresponding to the dose of light radiated to the photoelectric element of each pixel and corresponding to the frame rate of each operation mode such as the moving picture mode or still picture mode, and so forth.

Thus, the image detecting device according to the present invention can deal with a plurality of image detecting modes such as the moving picture mode and the still picture mode with different frame frequencies. In addition, the image detecting device can detect an image with a large S/N ratio and a high resolution. In particular, when the present invention is applied to a direct converting type image detecting device that directly converts an X-ray into electric charge, an image with a wide dynamic range can be obtained in both the moving picture mode and the still picture mode.

In the example, a high positive voltage is applied to the photoelectric film. Alternatively, a negative voltage may be applied to the photoelectric film. In this case, the orientation of the protecting diode 103 is reversed. Thus, the voltage applied to the bias line becomes negative. In the example, the TFT was used as a channel semiconductor film composed of a-Si. However, the semiconductor film may be composed of c-Si (crystal silicon), poly-Si (polycrystal silicon), $\mu$c-Si (micro-crystal silicon), or the like. When the channel semiconductor film is composed of c-Si, poly-Si, or $\mu$c-Si, the scan line driving circuit 7 may be integrally structured with the TFT array.

(Ninth Embodiment)

Figure 21:
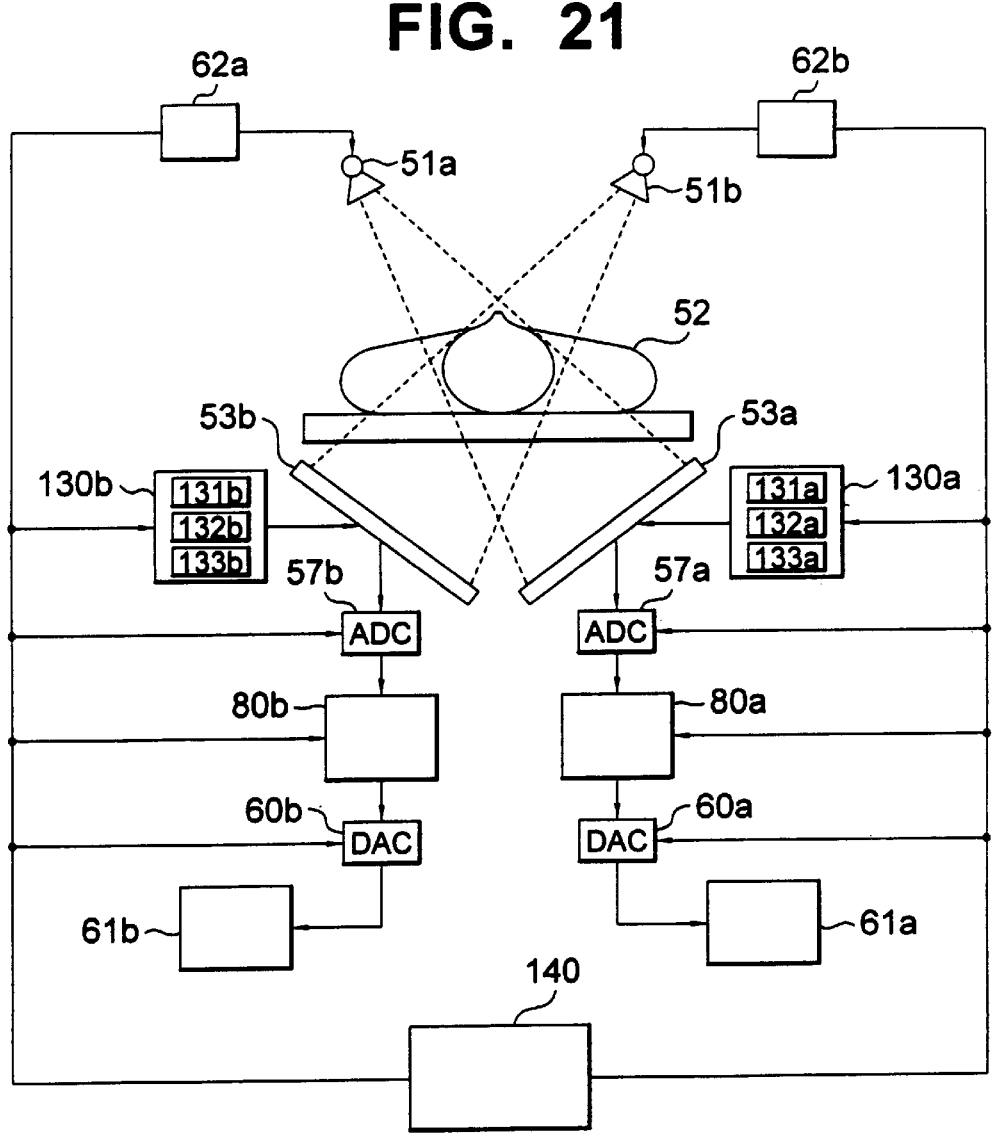
FIG. 21 is a schematic diagram showing an example of the structure of an image detecting device according to a ninth embodiment of the present invention.

FIG. 21 is a schematic diagram showing another example of the structure of an image detecting device according to a ninth embodiment of the present invention. The fundamental structure and operation of the image detecting device according to the ninth embodiment are the same as those according to the eighth embodiment.

The image detecting device according to the ninth embodiment is a bi-plane type image detecting device. The image detecting device has two pairs of image detecting portions and X-ray sources. The angle of the first pair is different from the angle of the second pair. The image detecting portions alternately detect images. The images detected by the image detecting portions are displayed on a monitor. Thus, images of a diseased part of a patient can be detected at different angles. Consequently, a surgical operation can be effectively performed. As a problem of the bi-plane image detecting method, since scattered light enters the in-active image detecting portion, the image quality deteriorates.

In FIG. 21, an X-ray radiated from a first X-ray source 51a penetrates an object 52 and enters a first a-Si TFT image detecting portion 53a. The first a-Si TFT image detecting portion 53a converts an X-ray that has penetrated the object 52 into an analog electric signal corresponding to the dose of the penetrated X-ray. The resultant analog signal is supplied to a first A/D converting portion 57a. The first A/D converting portion 57a converts the analog signal into a digital signal. The digital signal is supplied to a first signal processing means 80a. The first signal processing means 80a performs a predetermined signal process for the digital signal. The output signal of the first signal processing means 80a is supplied to a first D/A converting portion 60a. The first D/A converting portion 60a converts the digital signal into an analog signal. The analog signal is supplied to a first monitor 61a. The first monitor 61a displays an X-ray image corresponding to the analog signal received from the first D/A converting portion 60a. A controller 140 controls the X-ray source 51a, a detection controlling system 131, a scan Line drive controlling system 132, and a bias voltage controlling system 133 so that signals are properly detected.

At that point, the first a-Si TFT image detecting portion 53a causes the bias line power supply controlling means 133 to supply a control signal Sbias1 to a first bias line power supply Ebias1 so that the voltage Vs between the bias line and the pixel electrode to be larger than 0. The value of Vs can be set corresponding to the frame rate, the maximum stored amount of electric charge, and so forth. Thus, since electric charge can be stored until the voltage of the pixel electrode becomes Vs, an X-ray image can be obtained.

On the other hand, in the period of which the first a-Si TbT image detecting portion 53a detects an image, the second a-Si TFT image detecting portion 53b causes the bias line power supply controlling means 133b to supply a control signal Sbias2 to a second bias line power supply Ebias2 so that the voltage Vs between the bias line and the pixel electrode becomes 0 V.

In such a structure, even if scattered light of the first X-ray source 51a enters the second a-Si TFT image detecting portion 53b, the detected electric charge flows from the pixel electrode to the bias line power supply Ebias2 through the bias line. Thus, electric charge as noise is not stored in the second a-Si TFT image detecting portion 53b.

After the first a-Si TFT image detecting portion 53a has detected an image, the polarity of the bias line voltage is reversed so that the second a-Si TFT image detecting portion 53a detects an image. In other words, the bias line power supply controlling means 133 controls the first bias line power supply Ebias1 and the second bias line power supply Ebias2 so that the voltage Vs of the first bias line power supply Ebias1 becomes 0 and the voltage Vs of the second bias line power supply Ebias2 is higher than 0.

By repeating the above-described operation, the first a-Si TFT image detecting portion 53a and the second a-Si TFT image detecting portion 53b alternately detect images free of nose due to scattered light. The first a-Si TFT image detecting portion 53a and the second a-Si TFT image detecting portion 53b can detect an object at different angles. Thus, since a diseased part of a patient can be conveniently observed, a surgical operation and so forth can be effectively performed.

Figure 22:
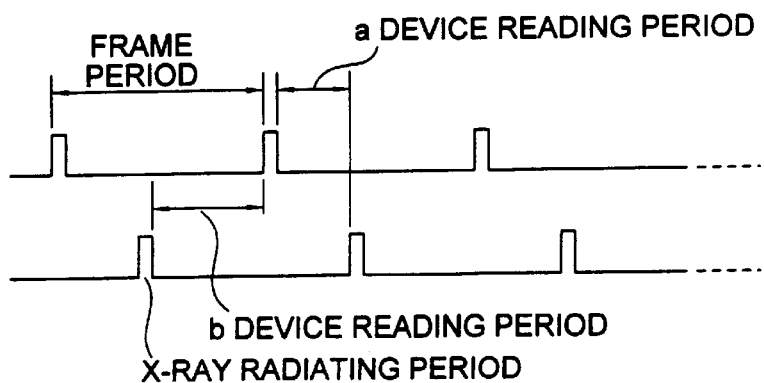
FIG. 22 is a timing chart showing examples of an X-ray radiation period and a signal reading period.

FIG. 22 is a timing chart showing waveforms of signals in an X-ray radiating period and a signal reading period.

The frame rate of each of the first image detecting portion and the second image detecting portion is for example 30 [fps]. The reading period is a reciprocal of the number of image detecting portions. Thus, an image should be read at a high frame rate. Consequently, the technique for improving the frame rate becomes more effective.

(Tenth Embodiment)

Figure 15:
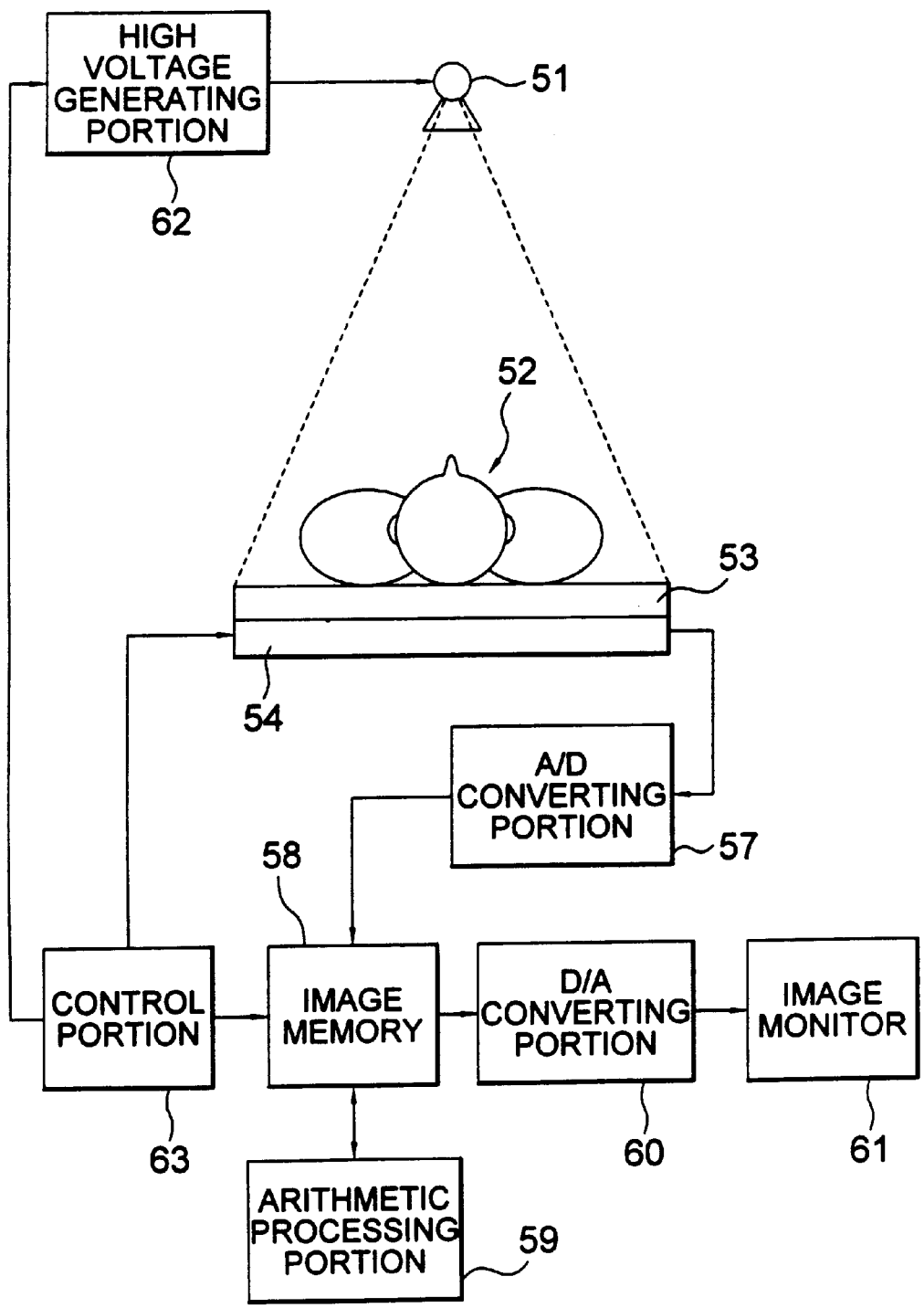
FIG. 15 is a schematic diagram showing an example of the structure of a system of an image detecting device.
Figure 16:
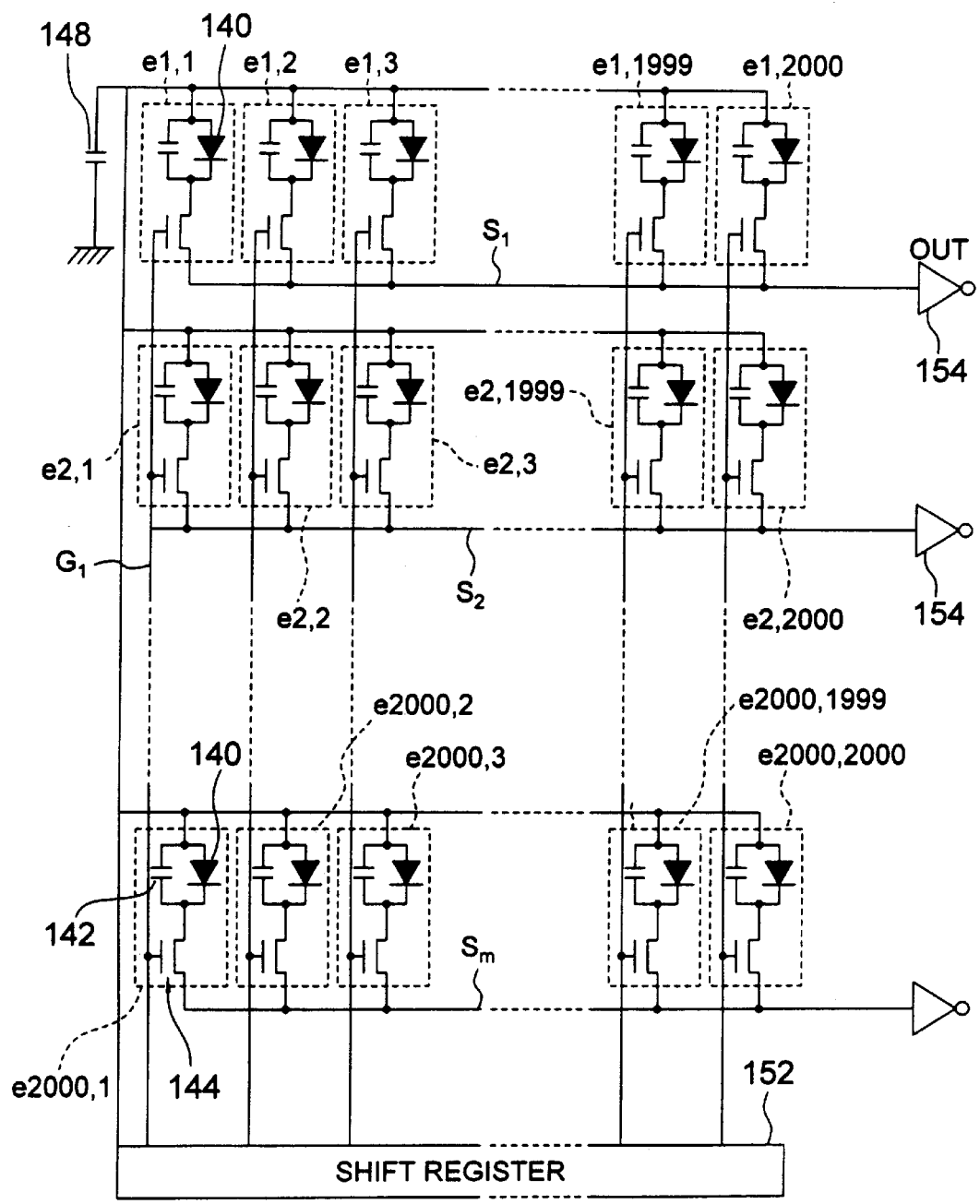
FIG. 16 is a schematic diagram showing an example of an array structure of a conventional image detecting device.
Figure 17:
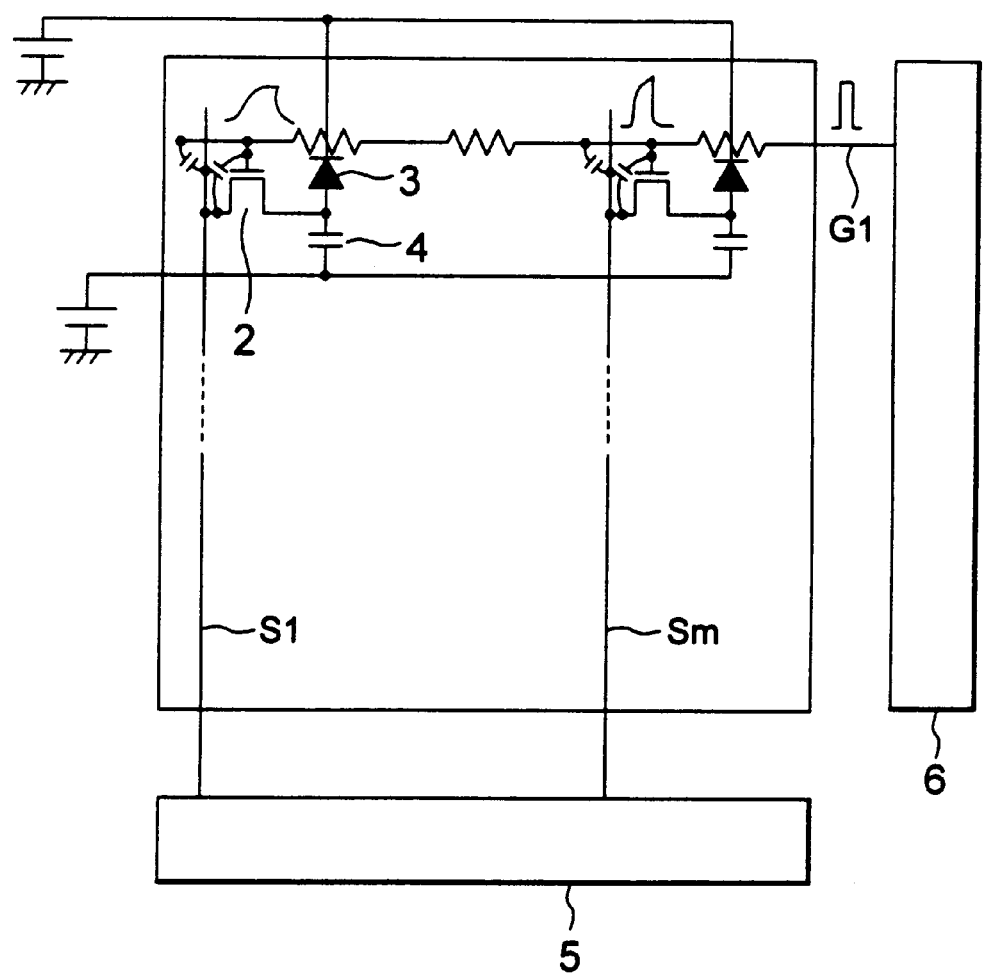
FIG. 17 is a schematic diagram for explaining a line resistance and a line capacitance of a conventional a-Si TFT image detecting device.
Figure 23:
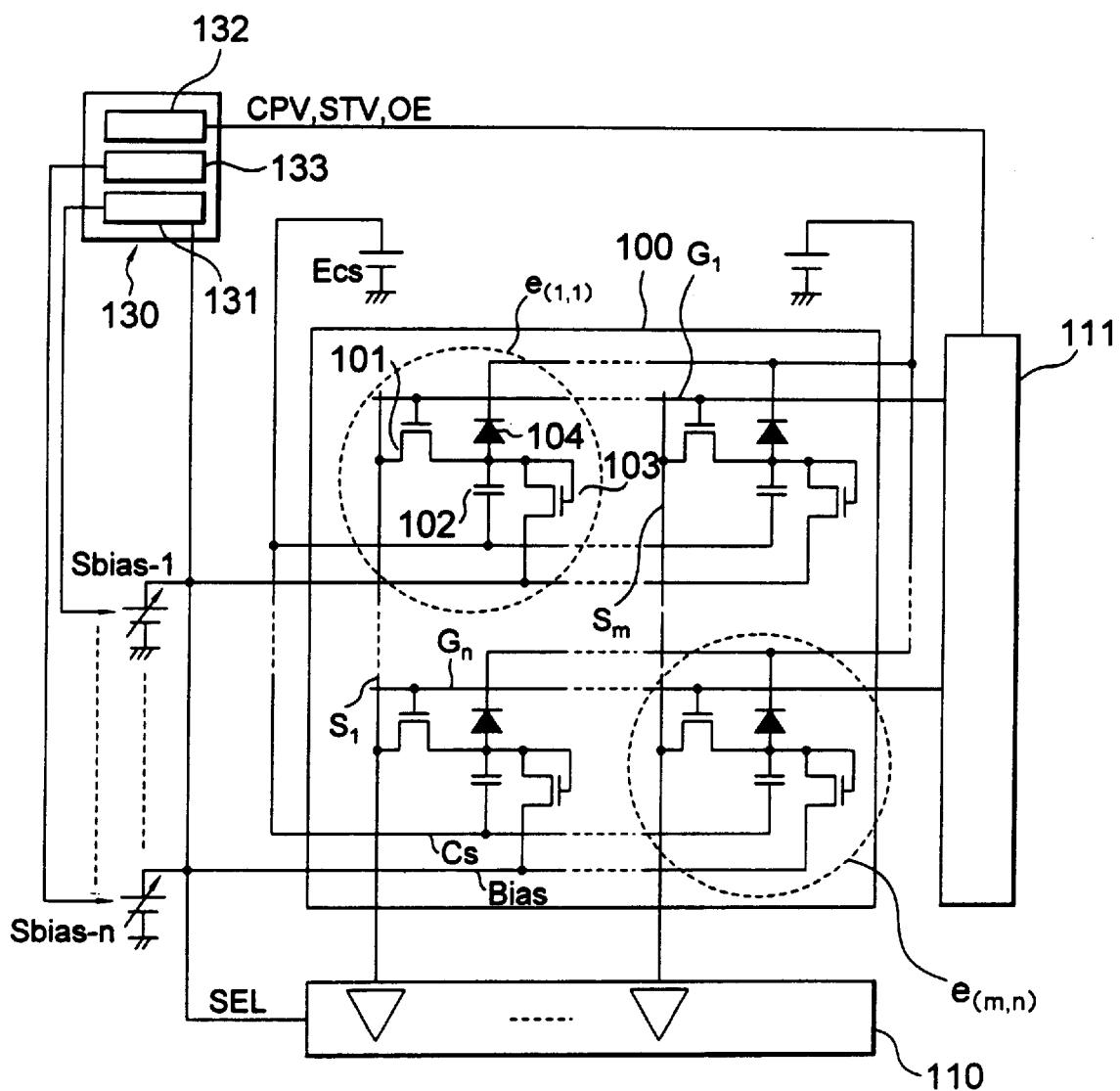
FIG. 23 is a circuit diagram showing an example of the structure of an image detecting device according to a tenth embodiment of the present invention.
Figure 24:
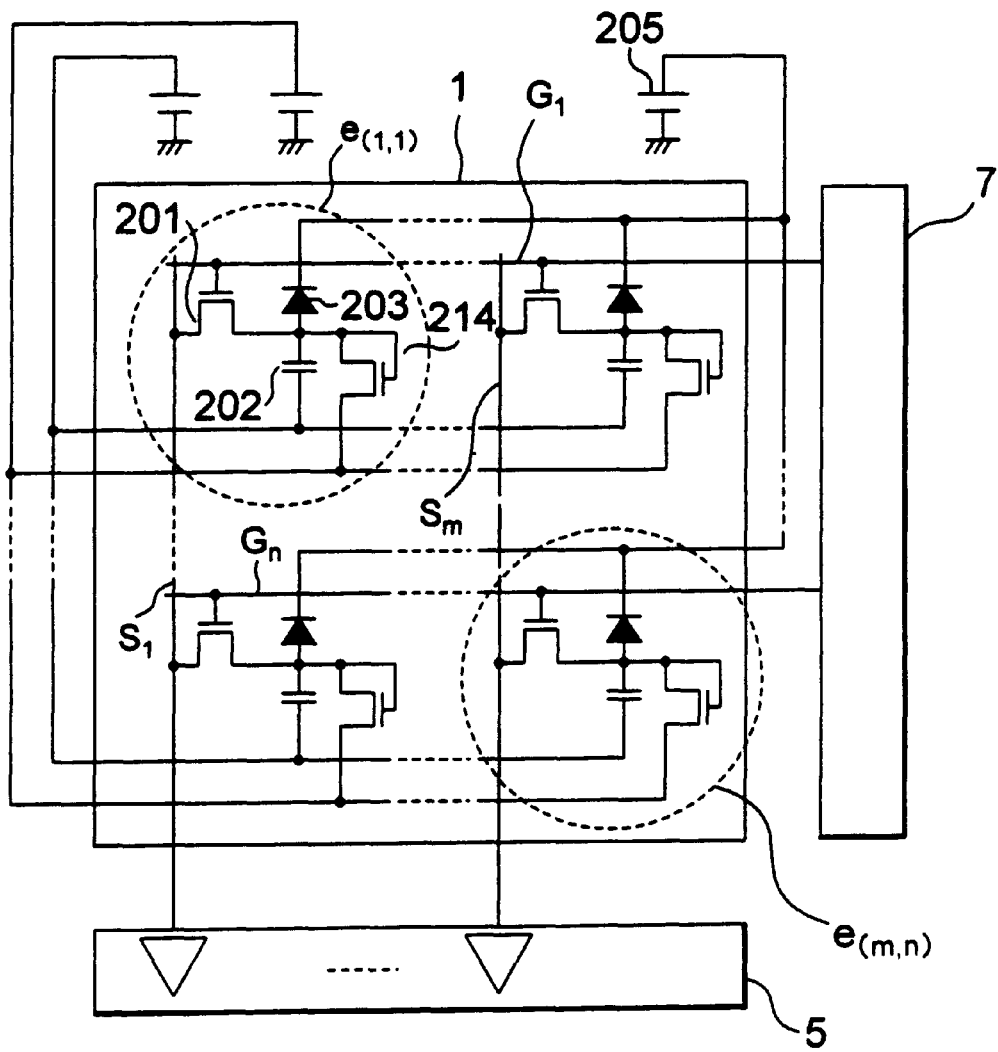
FIG. 24 is a circuit diagram showing an example of the structure of an image detecting device having pixels each of which has a protecting diode.

FIG. 23 is a circuit diagram showing an example of the structure of an image detecting device according to a tenth embodiment of the present invention. The structure of the image detecting device according to the tenth embodiment is the same as the structure of the conventional image detecting device shown in FIG. 15. In this example, an image detecting device 53 causes a bias line power supply controlling means 133 to properly control a detecting amplifier 110, a scan line driving circuit 111, and a bias line power supply Ebias.

Referring to FIG. 23, on an a-Si TFT array 100, pixels e (m, n), signal lines Sm, scan lines Gn, capacitor lines Cs, and bias lines Bias are disposed. Each of the pixels e (m, n) is composed of an electric charge reading a-Si TFT 101, a pixel capacitor 102, a protecting diode 103, and a photoelectric film 104 (not shown). A detecting amplifier 110 and a scan line driving circuit 111 are disposed on the TFT array 100 or another substrate 121 (not shown) through an FPC cable 120 or the like (not shown). The capacitor lines Cs and the bias lines Bias are connected to power supplies ECs and Ebias, respectively. The detecting amplifier 110 is connected to the signal lines Sm. The scan line driving circuit 111 is connected to the scan lines Gn.

In the image detecting device, the bias line power supplies Ebias are disposed corresponding to the individual scan lines. In other words, the bias lines Bias and the bias line power supplies Ebias are disposed corresponding to the individual scan lines. In such a structure, the bias voltage controlling system 133 can control individual bias voltage power supplies Ebias. Thus, the bias line voltage of each bias line can be independently controlled.

A controller 130 controls the bias line power supplies Ebias for the upper M scan lines and the lower N scan lines on the a-Si TFT array 100 so that the voltage Vs between the bias line and the pixel electrode becomes 0. On the other hand, the controller 130 controls the bias line power supplies Ebias for the other scan lines so that the voltage Vs becomes larger than 0. At that point, in the upper M scanning liens and the lower N scan lines on the a-Si TFT array 100, since electric charge generated in the photoelectric film 104 directly flows to the bias lines Bias, the electric charge is not stored in the pixel capacitors 102. Thus, the scan lines except for upper M scan lines and lower N scan lines (namely, scan lines of which Vs>0) are scanned by the scan line driving circuit 111.

Thus, since the number of scan lines scanned in one frame period is decreased, the reading period per scan line becomes long. Thus, residual electric charge that adversely affects picture quality can be suppressed.

Assuming that the reading period per scan line is the same as the reading period of the mode in which all the scan lines with the mode of scanning all the scan lines, an image with a higher frame rate can be obtained.

As with a chest image (40 cm×40 cm, several frames per second) and a heart image (15 cm×15 cm, several ten frames per second), even if the detection sizes and frame rates differ from each other, the same image detecting device can be used. Thus, the cost of the image detecting device can be reduced.

As described above, in the image detecting device according to the present invention, the bias voltage can be adjusted not only by the frame rate of an image, but also by the dose rate of the X-ray. Thus, an off-current of a bias diode can be controlled. Consequently, even if the amount of electric charge stored to each oixel is small, the S/N ratio of the image can be improved. On addition, a single image detecting device can deal with a plurality of image detecting modes with different frame rates. Particularly, in a direction converting type X-ray image detecting device of which each pixel has a protecting diode, the bias voltage applied to the protecting diode can be adjusted corresponding to each image detecting mode. Thus, since noise due to an off-leak current of the protecting diode can be suppressed, an image with a high quality can be obtained. Thus, images with high quality in various image detecting modes such as moving/ still picture mode and bi-plane image detecting mode can be detected by a single image detecting device.

In the image detecting device according to the present invention, the first switching element and the second switching element are controlled so that the first on-period and the second on-period overlap. The first switching element and the second switching element are synchronously driven. Thus, the number of pixels that detect a moving picture at a time becomes large. Consequently, signal delays and waveform distortion of scan line driving signals can be suppressed. Thus, an image detecting device with a large screen, a high resolution, and a high frame rate can be accomplished. As a result, the condition of an object can be obtained as a moving picture with high quality.

In addition, since a start signal that controls the scanning start timing of the scan line driving circuit is output for a period of at least (2N-1) clock pulses and N scan lines are selected at a time, the period for selecting one scan line becomes long. Thus, the influence against signal delays and waveform deterioration of scan line driving signals is alleviated. Consequently, in the penetration mode, although a very high resolution is not required, a high frame rate is required. Thus, the above-descried method is very effective.

In addition, the image detecting device according to the present invention has a gain selecting means for selecting the gain corresponding to the level of a signal that is output to a signal line and a frequency adjusting means for adjusting the frequency of the scanning signal corresponding to the selected gain. Thus, the output signal of the detecting amplifier can be adjusted to a value corresponding to the image detecting mode. In other words, with a signal supplied to the scan line driving circuit, an image detecting mode is selected. With a gain selection signal supplied to the gain selecting circuit or the detecting amplifier, even if the image detecting mode is changed, since the level of the input signal of the A/D converter does not vary regardless of the image detecting mode, the dynamic range of the A/D converter can be fully used. Thus, the S/N ratio of the detected image can be improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An image detecting device, comprising:
   photoelectric elements arranged in a matrix array, respective photoelectric elements having a capacity capable of storing electric charge corresponding to a dose of irradiation;
   a protecting element intervened between the capacitor and a bias line supplying a bias voltage;
   a scanning circuit configured to apply a scanning signal to a scan line; and
   a switching element, intervened between each of the photoelectric elements and a signal line, configured to supply the electric charge stored in the capacitor to the signal line when the switching element is conducting, the switching element being controlled by the scanning signal.

2. An image detecting device as set forth in claim 1, further comprising:
   a bias voltage controlling system connected to the bias line.

3. An image detecting device as set forth in claim 1, further comprising:
   a selecting circuit configured to select a frequency of the scanning signal, a level of the bias voltage being adjusted corresponding to the frequency of the scanning signal.

4. An image detecting device as set forth in claim 1, further comprising:

an outputting circuit configured to output a signal from the signal line, the signal corresponding to the electric charge stored in the capacitor; and an amplifying circuit configured to amplify a level of the signal corresponding to a frequency of the scanning signal.

5. An image detecting device as set forth in claim 1, further comprising:

an outputting circuit configured to output a signal from the signal line, wherein the electric charge is supplied from the capacitor via the switching element; and an amplifying circuit configured to am plify a level of the signal corresponding to the dose of irradiation.

6. An image detecting device as set forth in claim 1, wherein the respective photoelectric elements are capable of directly converting the irradiation to the electric charge.

7. An image detecting device as set forth in claim 1, wherein the respective photoelectric elements are capable of inducing the charge when irradiated by X-ray.

8. An image detecting device as set forth in claim 1, wherein respective photoelectric elements have a photoconductor made of at least one material selected from a-Se (amorphous selenium), $PbI_2$, TlBr and ZnCdTe.

9. An image detecting device as set forth in claim 1, wherein the protecting element is a thin film transistor.

10. An image detecting device as set forth in claim 1, wherein the protecting element is a diode.

11. An X-ray imaging system, comprising:

at least one X-ray source;

a radiation control circuit configured to control a radiating intensity of an X-ray;

at least one photoelectric element having a capacitor capable of storing electric charge corresponding to a dose of the X-ray when the photoelectric element is irradiated, the photoelectric element being arranged in a matrix array;

a protecting element intervened between the capacitor and a bias line suppling a bias voltage;

a scanning circuit configured to apply a scanning signal to a scan line; and a switching element, intervened between each of the photoelectric elements and a signal line, configured to supply the electric charge stored in the capacitor to the signal line when the switching element is on, the switching element being controlled by the scanning signal.

12. An X-ray imaging system as set forth in claim 11, wherein the protecting element is controlled corresponding to the radiating intensity of the X-ray.

13. An X-ray imaging system as set forth in claim 11, wherein a control circuit applies the bias voltage to the bias line connected to the protecting element, a level of the bias voltage being controlled corresponding to a radiating intensity of the X-ray.

14. An X-ray imaging system as set forth in claim 11, further comprising:

a selecting circuit configured to select a frequency of the scanning signal, the frequency of the scanning signal being controlled corresponding to the radiating intensity of the X-ray.

15. An X-ray imaging system as set forth in claim 11, further comprising:

a selecting circuit configured to select a frequency of the scanning signal, wherein the radiating intensity of the X-ray is controlled corresponding to the frequency of the scanning signal selected.

16. An X-ray imaging system as set forth in claim 11, further comprising:

an outputting element confred to output a signal from a signal line, the signal corresponding to the electric charge supplied to the signal line from the capacitor via the switching element; and an amplifying circuit configured to amplifv a level of the signal corresponding to the radiating intensity of the X-ray.

17. An X-ray imaging system, comprising:

at least one device radiating X-ray;

a first image detecting device comprising at least one first photoelectric element having a first capacitor capable of storing electric charge corresponding to a dose of the X-ray when the photoelectric element is irradiated;

a second image detecting device comprising at least one second photoelectric element having a second capacitor capable of storing the electric charge corresponding to the dose of the X-ray when the photoelectric element is irradiated;

a control circuit configured to control a first detecting period for storing the electric charge to the first capacitor, a second detecting period for storing the electric charge to the second capacitor, the first detecting period and the second detecting period being exclusively set; and a source configured to supply a ground potential to the first capacitor during the second detecting period and to the second capacitor during the first detecting period.

18. An X-ray imaging system as set forth in claim 17, wherein the first image detecting device has at least one first bias line connected to the first capacitor, the ground potential being supplied to the first capacitor via the first bias line, wherein the second image detecting device has at least one second bias line connected to the second capacitor, the ground potential being supplied to the second capacitor via the second bias line.

19. An imaging detecting device, comprising:

first photoelectric elements and second photoelectric elements arranged in a matrix array, at least one first scan line and at least one second scan line arranged alternately;

a scanning driver for supplying scanning signals to the first scan line and the second scan line;

first switching elements intervened between respective first photoelectric elements and the first scan line;

second switching elements intervened between respective second photoelectric elements and the second scan line; and a scanning circuit controlling the scanning driver, the scanning driver supplying a first signal for enabling the first switching elements to be on during a first period, for enabling the second switching elements to be on during a second period, at least one part of the first period and the second period being overlapped, a second signal for enabling the first switching elements to be off during the first period except the overlapped period, a third signal for enabling the second switching elements to be off during the second period except the overlapped period.

* * * * *

UNITED STATES PATENT AND TRADEMARK OFFICE
CERTIFICATE OF CORRECTION

PATENT NO. : 6,185,274 B1
DATED : February 6, 2001
INVENTOR(S) : Akira Kinno et al.

It is certified that error appears in the above-identified patent and that said Letters Patent is hereby corrected as shown below:

Column 1,
Line 1, insert -- AN -- before "IMAGE".

Column 3,
Line 37, change "thus" to -- Thus --.

Column 6,
Line 42, change "an" to -- on --.

Column 7,
Line 66, first occurrence, change ">" to -- $\geq$ --.

Column 10,
Line 17, change "of/the" to -- of the --.

Column 11,
Line 47, change "resisters" to -- registers --.

Column 12,
Line 39, change "resisters" to -- registers --.

Column 16,
Line 48, change "represent" to -- present --.

Column 18,
Line 4, change "v-alue" to -- value --;
Line 28, 29 and 30, first occurrence, change ">" to -- $\geq$ --;

Column 20,
Line 2, change "Line" to -- line --;
Line 13, change "TbT" to -- TFT --.

Column 21,
Line 50, change "oixel" to -- pixel;
Line 51, change "On" to -- In --.

Column 23,
Line 12, change "am plify" to -- amplify --.

UNITED STATES PATENT AND TRADEMARK OFFICE
CERTIFICATE OF CORRECTION

PATENT NO. : 6,185,274 B1
DATED : February 6, 2001
INVENTOR(S) : Akira Kinno, et al.

It is certified that error appears in the above-identified patent and that said Letters Patent is hereby corrected as shown below:

Column 24,
Line 5, change "confred" to -- configured --.

Signed and Sealed this

Fourth Day of December, 2001

Attest:

*Nicholas P. Godici*

NICHOLAS P. GODICI
*Attesting Officer*    *Acting Director of the United States Patent and Trademark Office*